(12) United States Patent
Komiya et al.

(10) Patent No.: US 7,451,587 B2
(45) Date of Patent: Nov. 18, 2008

(54) MOWER TRACTOR

(75) Inventors: Toshitaka Komiya, Osaka (JP);
Toshihiko Ibe, Osaka (JP); Takatoshi Meno, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 80 days.

(21) Appl. No.: 11/268,528

(22) Filed: Nov. 8, 2005

(65) Prior Publication Data

US 2006/0090442 A1    May 4, 2006

Related U.S. Application Data

(63) Continuation of application No. PCT/JP2004/006234, filed on Apr. 28, 2004.

(30) Foreign Application Priority Data

| May 8, 2003 | (JP) | ............................. 2003-130317 |
| May 20, 2003 | (JP) | ............................. 2003-142371 |
| May 22, 2003 | (JP) | ............................. 2003-145371 |
| May 27, 2003 | (JP) | ............................. 2003-149389 |

(51) Int. Cl.
*A01D 34/00* (2006.01)
(52) U.S. Cl. ...................... 56/17.1; 56/14.9; 56/DIG. 22
(58) Field of Classification Search .................. 56/14.7, 56/6, 12.7, 14.8, 14.9, 15.1–15.3, 15.7, 15.9, 56/17.1, DIG. 22
See application file for complete search history.

(56) References Cited

U.S. PATENT DOCUMENTS 2,928,223 A * 3/1960 Danuser ..................... 56/13.6
3,550,364 A * 12/1970 Musgrave ..................... 56/15.8
4,737,067 A * 4/1988 Samejima et al. ............ 414/686
4,804,060 A * 2/1989 Iritani ......................... 180/233
5,813,203 A * 9/1998 Peter .......................... 56/17.2
6,237,957 B1 * 5/2001 Takekata et al. ............ 280/781

FOREIGN PATENT DOCUMENTS

| JP | 4-35028 | 3/1992 |
| JP | 07-327459 | 9/1995 |
| JP | 2000-245224 | 9/2000 |
| JP | 2000-300036 | 10/2000 |
| JP | 2002-305930 | 10/2002 |

OTHER PUBLICATIONS

International Search Report for International Application No. PCT/JP2004/006234, Japanese Patent Office, mailed Jul. 20, 2004.

* cited by examiner

*Primary Examiner*—Thomas B Will
*Assistant Examiner*—Alicia Torres
(74) *Attorney, Agent, or Firm*—Sterne, Kessler, Goldstein & Fox P.L.L.C.

(57) ABSTRACT

A mower tractor (1) comprises: a mid-mount mower (5) under a middle bottom portion thereof between front wheels (2;2) and rear wheels (3;3); a body frame (8); a transmission casing (24) having an input shaft (58) disposed laterally eccentrically in the body frame (8); an engine (23) having an output shaft (55); a propeller shaft (14) and universal joints (27) interposed between the output shaft (55) of the engine (23) and the input shaft (58) of the transmission casing (24); and a device (60) for restricting height of the mower (5) disposed between the propeller shaft and the body frame.

19 Claims, 25 Drawing Sheets

(a)

(b)

(a)

(b)

(a)

(b)

(c)

(a)

(b)

MOWER TRACTOR

TECHNICAL FIELD

The present invention relates to a mower tractor comprising a mid-mount mower under the middle bottom portion thereof between front wheels and rear wheels. It also relates to a linkage for lifting the mid-mount mower, and to a device for restricting height of the mower.

BACKGROUND ART

Conventionally, as disclosed in Japanese Laid Open Gazette No. 2000-245224, there is a well-known lifting device for vertically movably attaching a mid-mount mower to a tractor at a bottom portion of a step between front wheels and rear wheels.

With respect to a power transmission system to the mid-mount mower, engine power is transmitted through a belt from an engine pulley or through universal joints to a pulley provided coaxially to a blade shaft or to a counter shaft behind the blade shaft, thereby driving a blade of the mid-mount mower.

Further, the linkage for vertically movably lifting the mid-mount mower comprises: a front link rotatably connecting a front portion of the mower to a front portion of the tractor; a lift link rotatably connected at a front portion thereof to a support member provided at a fore-and-aft intermediate portion of the tractor; a lift cylinder extended rearward from the mower at a rear portion of the tractor body; and an intermediate link pivotally connecting the lift cylinder to the lift link.

However, the conventional mid-mount mower lifting device has a drive shaft which is disposed not at the lateral center portion of the tractor body but under an engine crankshaft and an input shaft of a hydrostatic stepless transmission (HST), wherein the engine crankshaft and the HST input shaft are integrally and coaxially disposed in a clutch housing. There is a small space around the drive shaft such as to restrict design freedom.

Further, a bracket for attaching a device for restricting height of the mid-mount mower into the clutch housing is fastened to the body frame with bolts or the like so as to increase the number of parts and costs.

Also, the bracket occupies a large space such as to restrict design freedom.

SUMMARY OF THE INVENTION

In consideration of the above problems, the present invention is intended to provide a sufficient space around the drive shaft in the clutch housing for arrangement of the mid-mount mower lifting device, the mid-mount mower height restricting device and so on. The present invention is also intended to reduce the number of parts and to reinforce the body frame.

According to the present invention, a mower tractor comprises: a mid-mount mower under a middle bottom portion thereof between front wheels and rear wheels; a body frame; a transmission casing having an input shaft disposed laterally eccentrically in the body frame; an engine having an output shaft; a propeller shaft and universal joints interposed between the output shaft of the engine and the input shaft of the transmission casing; and a device for restricting height of the mower disposed between the propeller shaft and the body frame.

Therefore, a space inside the vehicle body at the side opposite to the input shaft can be large enough to have the mower height restricting device assembled therein. The inside space enclosed by the body frame can be large enough to be used for various arrangement while the mower height restricting device is disposed therein.

Preferably, the mower tractor further comprises a reinforcing bracket spanned between left and right portions of the body frame at a position forwardly downward from the input shaft of the transmission casing, wherein the device for restricting height of the mower is disposed on the reinforcing bracket.

Therefore, the single bracket for arrangement of the mower height restricting device can also be used for reinforcement, thereby reducing the number of parts.

BEST MODE FOR CARRYING OUT THE INVENTION

A general structure of a mower tractor having a mower height restricting device according to the present invention will be described.

Figure 1:
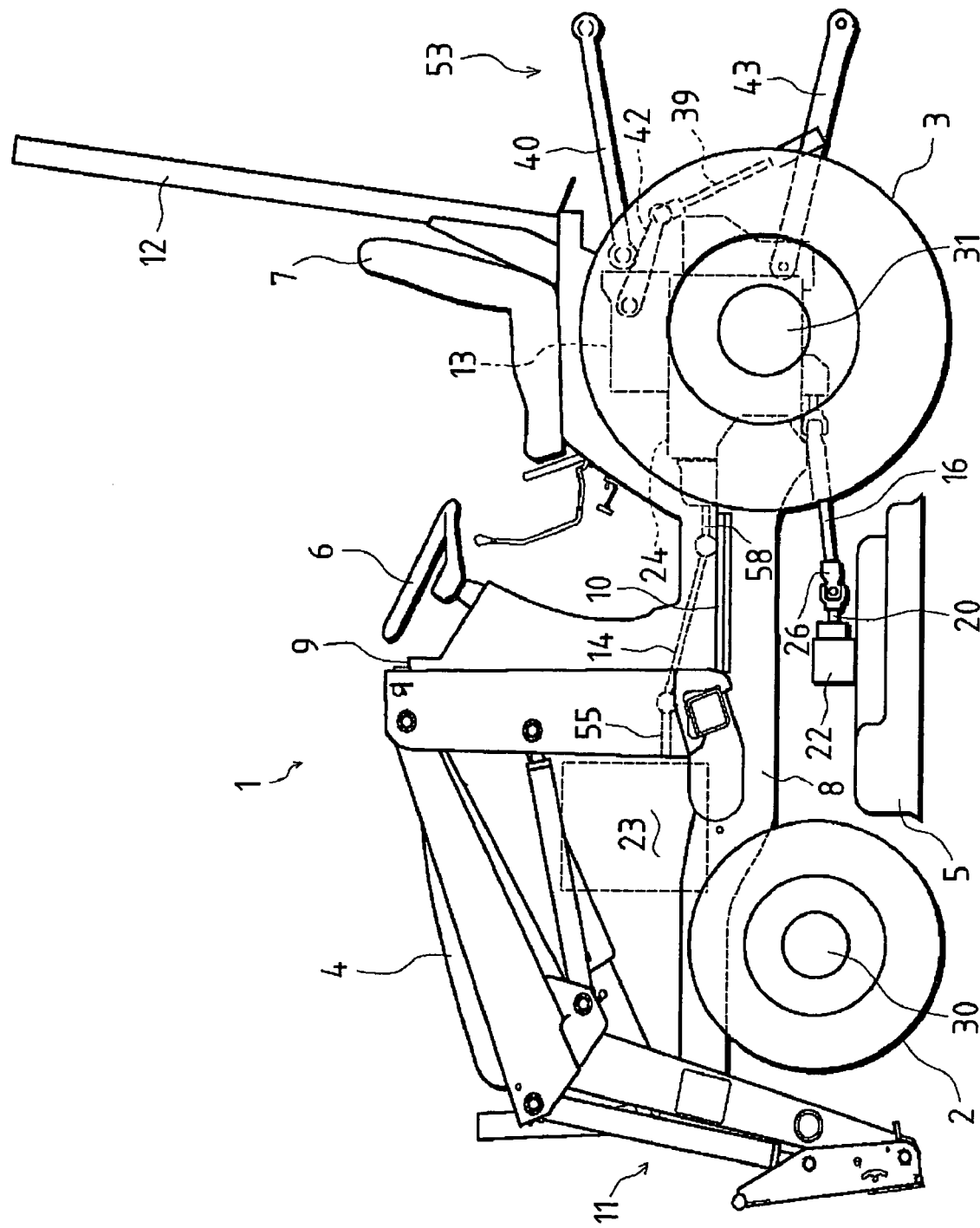
FIG. 1 is a side view of an entire mower tractor according to the present invention.
Figure 2:
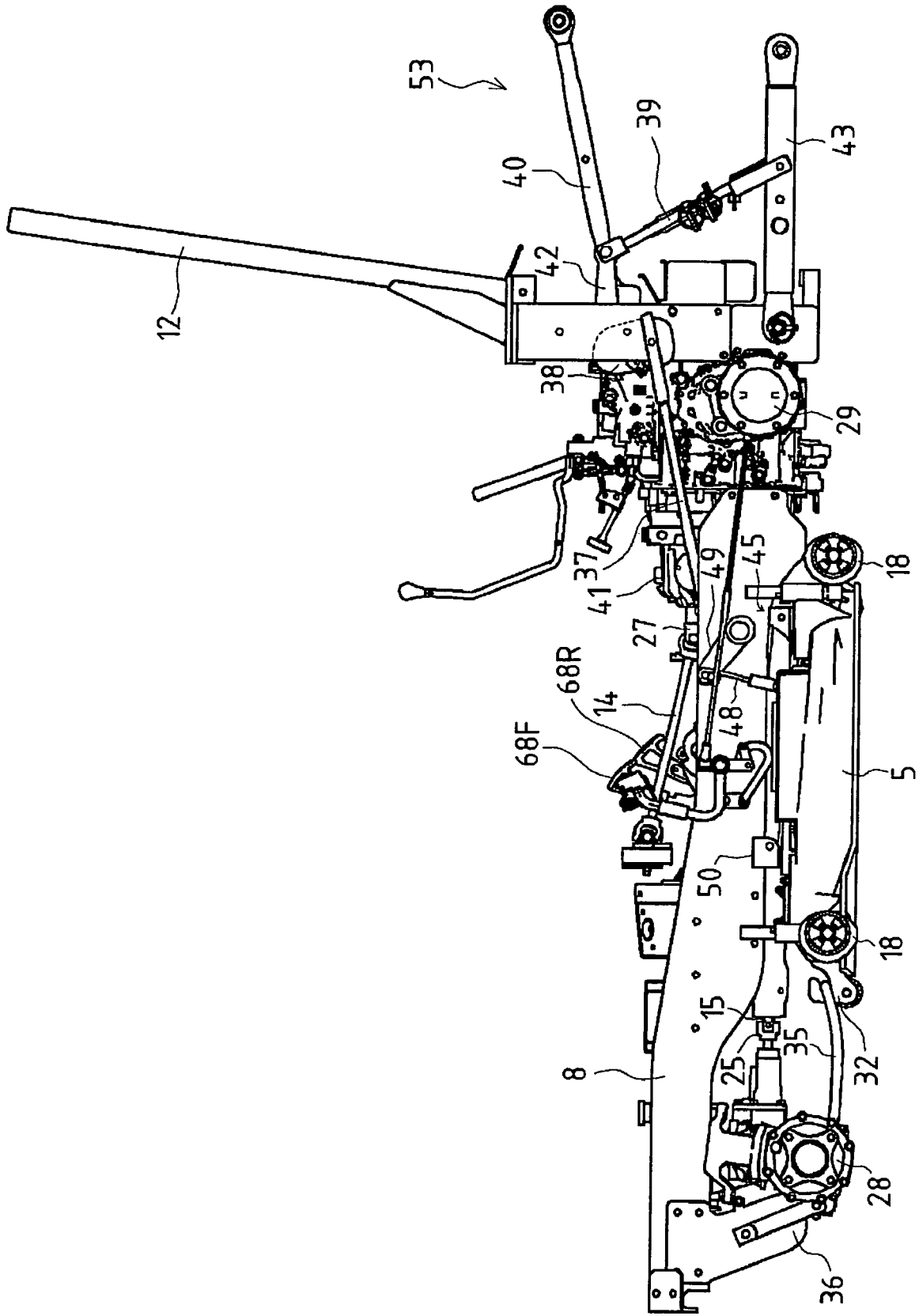
FIG. 2 is a side view of an interior structure of the mower tractor.

As shown in FIGS. 1 and 2, a mower tractor 1 has a tractor body, whose front portion supports front wheels 2, and whose rear portion supports rear wheels 3. Mower tractor 1 has a body frame 8, whose front portion supports a bonnet 4 and an engine 23 in bonnet 4. Body frame 8 is provided at a front or intermediate portion thereof with a lifting device 11, onto which a front-mount work machine such as a dozer, a bucket or a fork can be attached. Lifting device 11 comprises booms, which are doglegged in side view, and hydraulic cylinders. A dashboard 9 is continuously mounted behind bonnet 4. A steering wheel 6 projects upward from dashboard 9. A driver's seat 7 is disposed behind steering wheel 6. A step 10 is disposed over body frame 8 between the rear portion of bonnet 4 and seat 7. A gate-like shaped ROPS frame 12 is laterally extended over body frame 8 behind seat 7. A mid-mount mower 5 is attached to the bottom of step 10 between front wheels 2 and rear wheels 3 through a later-discussed lift linkage.

A transmission casing 24 is disposed below seat 7, and body frame 8 is joined to a front surface of transmission casing 24. A damper, a drive shaft, an engine output shaft 55 and a propeller shaft 14 are disposed inside body frame 8 so as to transmit power of engine 23 into transmission casing 24. Engine input shaft 58, a front-wheel driving shaft 15, and a mid PTO shaft 16 project from the front surface of transmission casing 24. Power outputted from front-wheel driving shaft 15 is transmitted into a front axle casing 28 through a universal joint 25 so as to drive front wheels 2 which are provided on respective laterally opposite front axles 30 projecting from front axle casing 28. Power outputted from mid PTO shaft 16 is transmitted to mid-mount mower 5 through a universal joint 26.

Further, rear axle casings 29 are fixed onto lateral opposite surfaces of a rear portion of transmission casing 24 and support respective rear axles 31. Rear wheels 3 are attached onto respective rear axles 31. A hydrostatic stepless transmission (HST) 41 is integrally provided on the front side of transmission casing 24. A forward traveling accelerator pedal 68F and a rear traveling accelerator pedal 68R are disposed below seat 7 so as to be operated for optionally setting the driving direction and speed of rear wheels 3. A hydraulic pressure casing 13 is mounted on the top surface of transmission casing 24. To constitute a three-point linkage 53 for lifting a working machine, lift arms 42 are extended from hydraulic pressure casing 13 and connected to respective lower links 43 through respective lift rods 39, and a top link 40 are extended from the rear surface of hydraulic pressure casing 13. A rear PTO shaft (not shown) projects from the rear surface of transmission casing 24. A working machine attached onto linkage 53 is driven by receiving power outputted from the rear PTO shaft.

Figure 3:
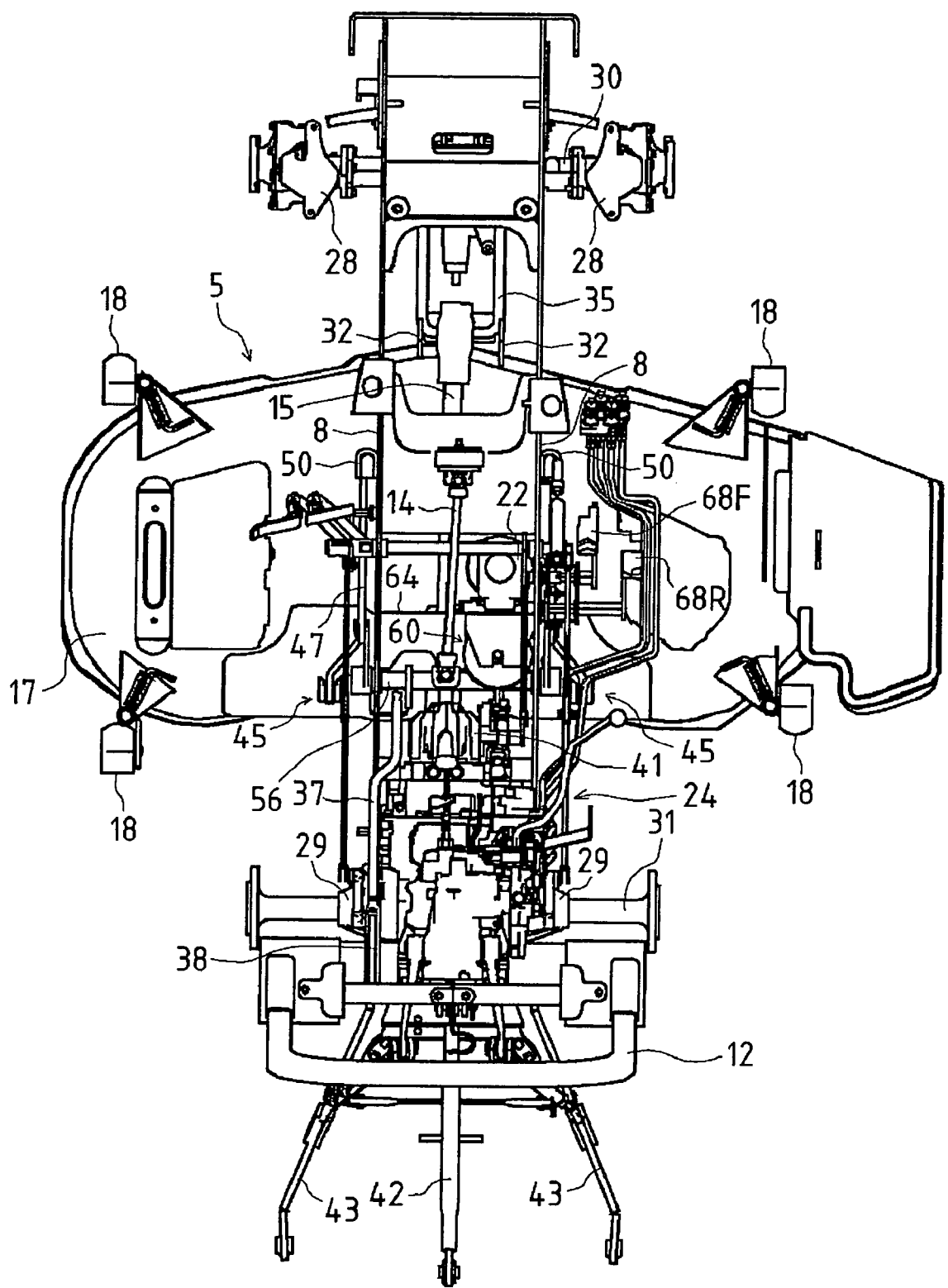
FIG. 3 is a plan view of the interior structure of the mower tractor.

Mid-mount mower 5 disposed below abdominal step 10 between front wheels 2 and rear wheels 3 comprises a mower deck 17 (see FIG. 3), which is provided at lateral opposite sides of front and rear portions thereof with grounding wheels 18. A blade is disposed in mower deck 17, and a gearbox 22 is disposed on the substantially center portion of the top surface of mower deck 17. Mid-mount mower 5 has an input shaft 20 projecting rearward from gearbox 22. A universal joint device 26 connects input shaft 20 to mid PTO shaft 16 projecting forward from the front lower portion of transmission casing 24 so as to transmit power to input shaft 20.

A linkage for lifting the mid-mount mower will now be described.

As shown in FIGS. 2 to 5, two left and right hooks 32 project forward from the front portion of mower deck 17. A front link 35 is hooked on hooks 32 and pivoted at a front portion thereof onto a support plate 36 fixed on the front portion of body frame 8, thereby suspending the front portion of mid-mount mower 5 from the front upper portion of the tractor body. A pair of left and right mower support mechanisms 45 are provided on the rear portion of the top surface of mower deck 17.

Each of mower support mechanisms 45 comprises a stay 46 fixed on mower deck 17, a plate-like lift link 47 connected to stay 46, an intermediate link 48 for hanging lift link 47, and a shaft link 49 fixed onto each of opposite ends of a later-discussed mid rockshaft 56. Intermediate link 48 is made of a U-like shaped metal, wire or the like.

Shaft link 49 comprises a pipe-shaped boss portion and an arm portion 49a projecting the boss portion. Intermediate link 48 is pivotally fitted at one end thereof into a hole bored in a tip portion of arm portion 49a, and at the other (lower) end thereof onto lift link 47. Lift link 47 is fixed at one end thereof to stay 46, and supported at the other end thereof by a support stay 50 fixed on body frame 8.

Due to such a construction, mid-mount mower can be vertically moved by rotating mid rockshaft 56.

Intermediate link 48 may be made of a chain. When a chain serves as the intermediate link, the intermediate link requires no pivotal connection member to be connected to lift link 47 and to arm portion 49a of shaft link 49, thereby reducing the number of parts. Further, in comparison with the intermediate link made of the U-like metal, which may be bent by stress, the intermediate link made of the chain is flexible so as to be prevented from being damaged.

Mid rockshaft 56 is a columnar bar, which is rotatably spanned in body frame 8 and projects at left and right ends thereof outward from body frame 8. Onto the peripheral surface of mid rockshaft 56 are fixed a connection plate 59, and a stopper 61 constituting a mower height restricting device 60. Connection plate 59 and stopper 61 have respective portions projecting in the same radial direction of mid rockshaft 56, so that, during rotation of mid rockshaft 56, the projecting portions of connection plate 59 and stopper 61 are prevented from hitting against transmission casing 24.

Mower lifting link 37 is pivoted at one end thereof onto connection plate 59, and connected at a rear end thereof through a swing bracket 38 to lift arm 42 disposed at the rear portion of the tractor body, so that mower lifting link 37 is moved forward and rearward by rotating lift arm 42.

When mower lifting link 37 is pulled rearward, connection plate 59 fixed on mid rockshaft 56 is rotated rearward together with mid rockshaft 56 so as to elevate mid-mount mower 5.

The linkage for lifting mid-mount mower is configured as the above, so that, by manipulating a lift lever disposed adjacent to seat 7, lift arm 42 and mower lifting link 37 are operated so as to elevate or lower mid-mount mower 5.

Description will now be given of an arrangement in front of transmission casing 24, including height restricting device 60 for mid-mount mower 5.

Figure 4:
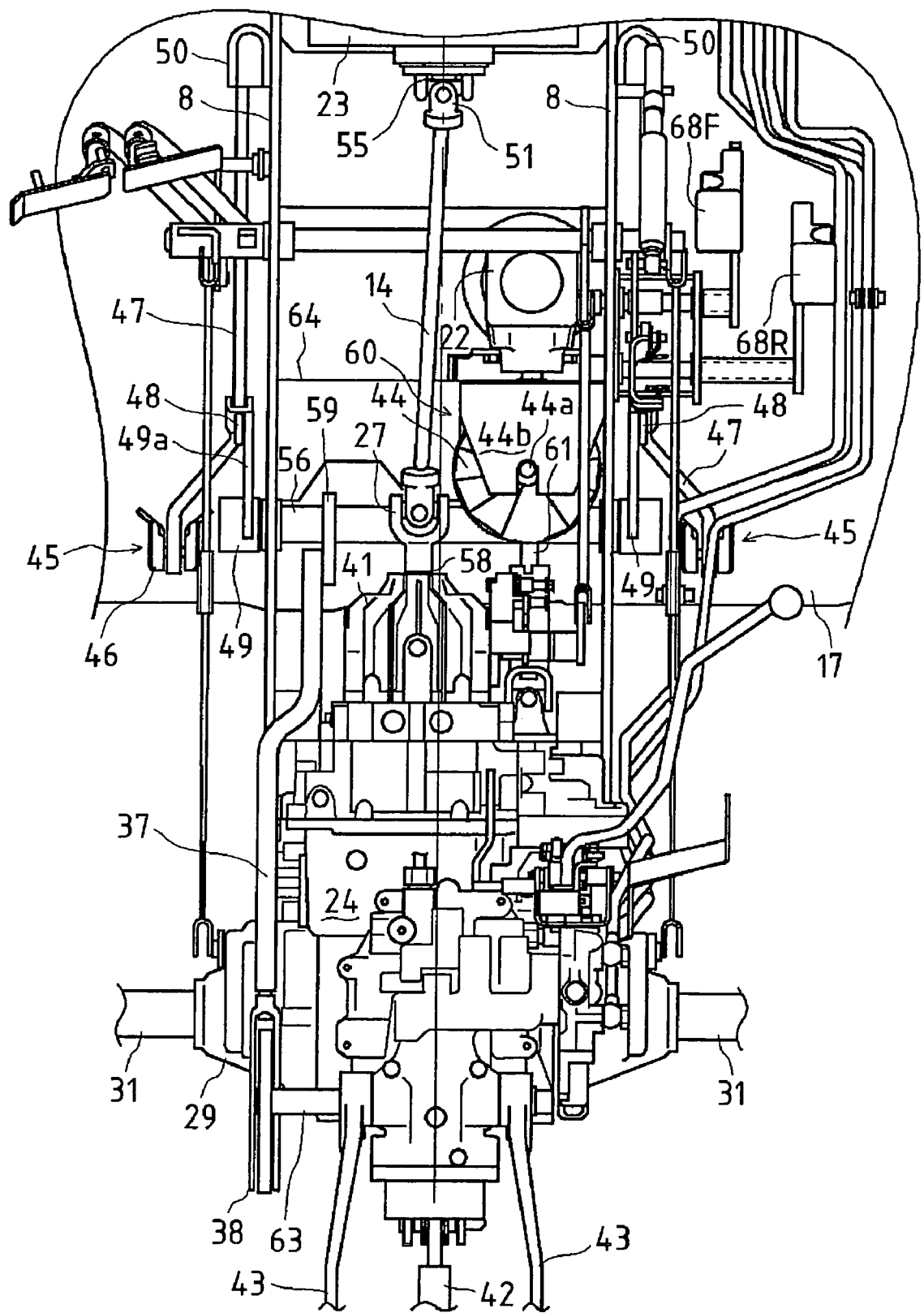
FIG. 4 is an enlarged plan view of arrangement in front of a transmission casing.
Figure 5:
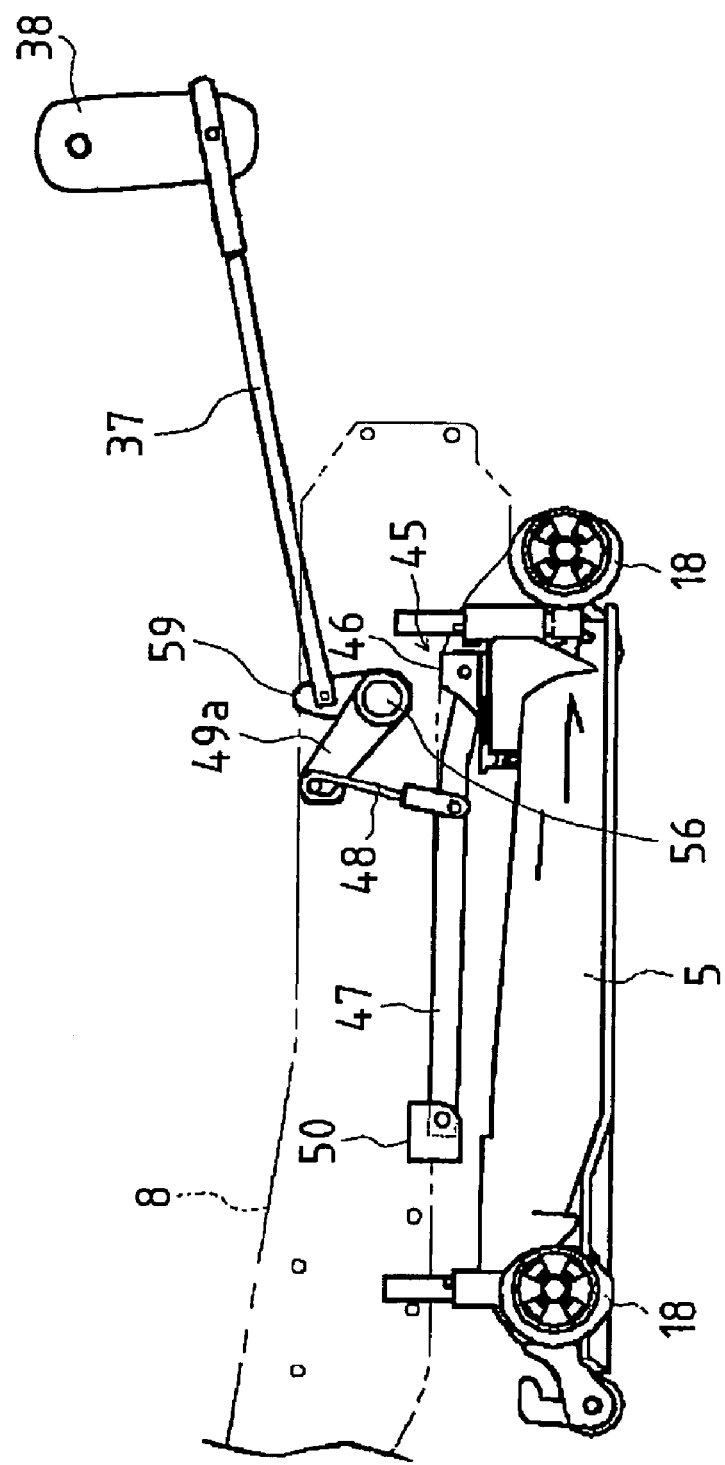
FIG. 5 is a side view of a mid-mount mower lifting linkage.
Figure 6:
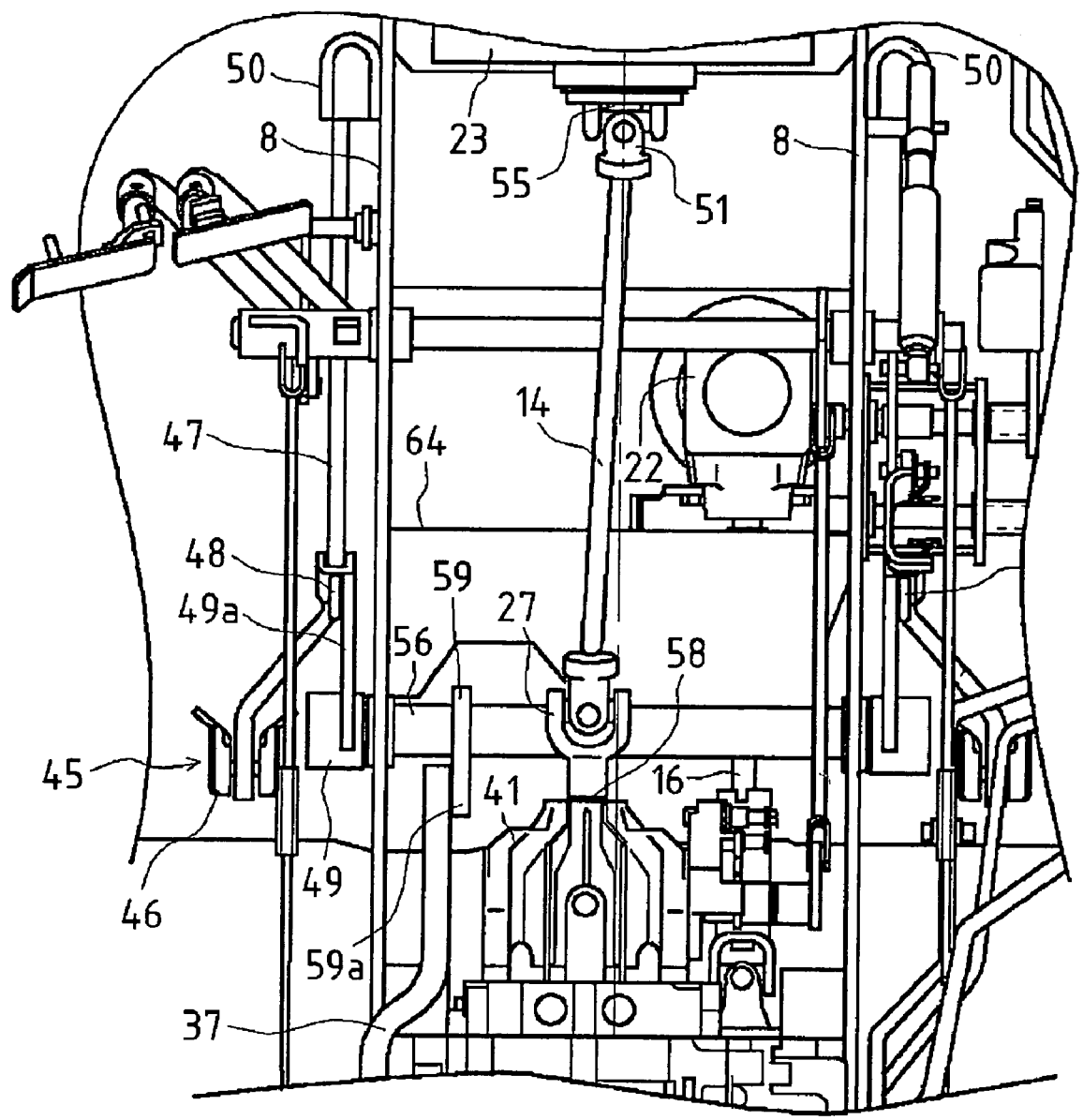
FIG. 6 is an enlarged plan view of arrangement in a space between an engine and the transmission casing.
Figure 7:
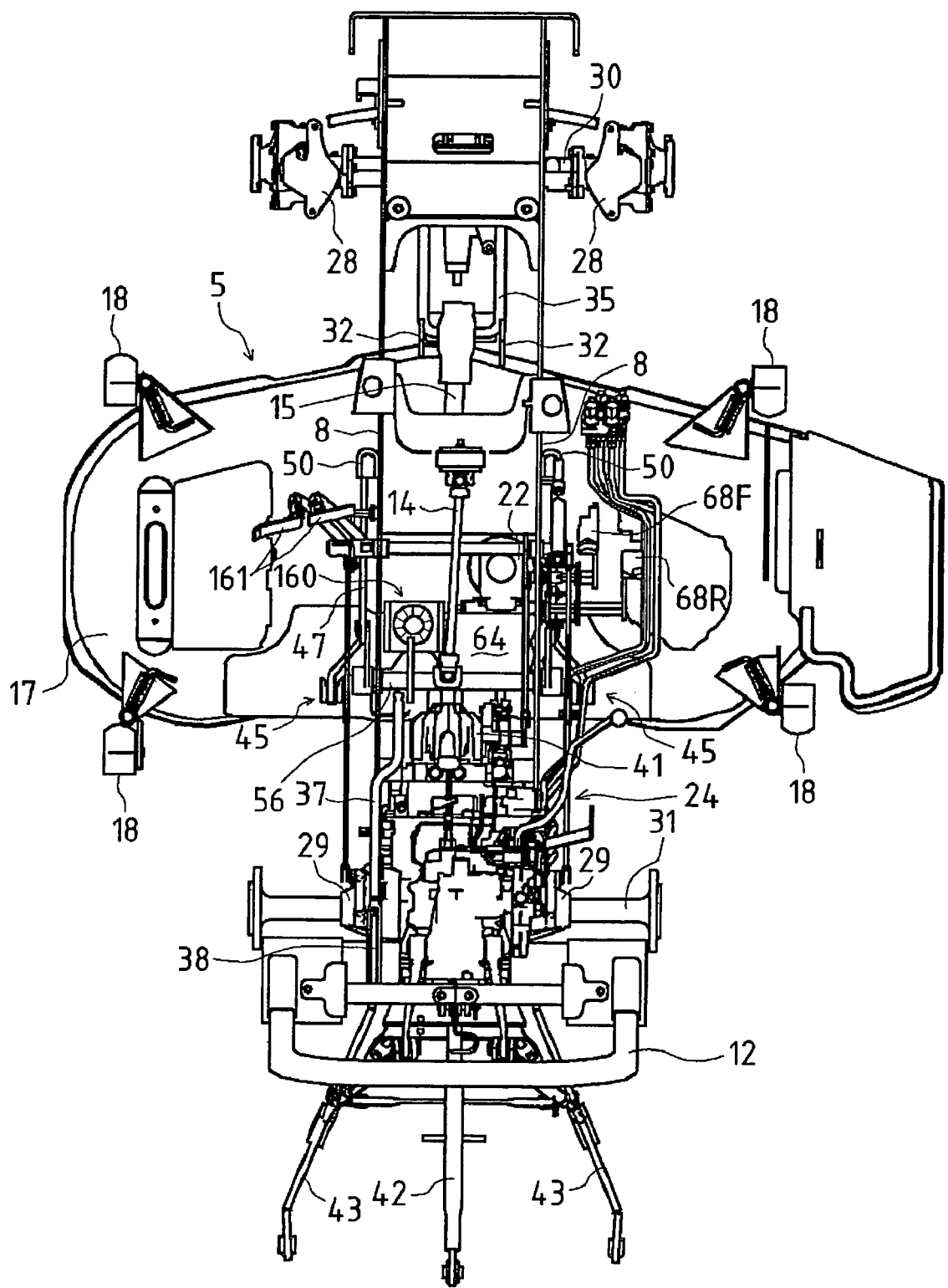
FIG. 7 is a plan view of an interior structure of a mower tractor according to a second embodiment.

As shown in FIGS. 4 and 6, a reinforcing bracket 64 made of a plate member is fixedly spanned between left and right portions of body frame 8 so as to reinforce body frame 8. A casing of mower height restricting device 60 is fixed on a right portion of reinforcing bracket 64.

Connection plate 59 is disposed at the left side of the tractor body in the traveling direction, and at a position forward and leftward from HST 41 so as to be prevented from interfering with HST 41. A universal joint 27 is disposed just above mid rockshaft 56. Propeller shaft 14 is interposed between universal joints 27 and 51. Output shaft 55 of engine 23 projects rearward at the lateral center of the tractor body, and input shaft 58 projecting from the front portion of HST 41 is offset leftward from the lateral center of the tractor body. In other words, HST 41 is disposed relatively leftward from the middle position between left and right portions of body frame 8 so as to expand a space between propeller shaft 14 and the right portion of body frame 8. Mower height restricting device 60 is disposed in the expanded space.

Stopper 61, serving as mower height restricting device 60, fixedly projects upward from the rightward portion of mid rockshaft 56 in the traveling direction of the tractor body. Stopper 61 is substantially reversed L-like shaped when viewed in side, and has a tip contacting a peripheral portion of a restriction member 44. Restriction member 44 is disposed in a casing 44b, which is substantially laterally turned U-like shaped when viewed in side. Casing 44b is fixed at the lower portion thereof onto reinforcing bracket 64. Namely, reinforcing bracket 64 is spanned between the left and right portions of body frame 8 in front of mid rockshaft 56.

Substantially discoid restriction member 44 has upper surfaces arranged in ascending tiers, against which a tip of stopper 61 can abut so as to restrict height of the mid-mount mower. In this regard, the substantially fan-like upper surfaces to abut against stopper 61 are arranged at regular angles. The tires of the upper surfaces gradually ascend or descend in the peripheral direction of restriction member 44. A vertical operation shaft 44a is disposed at the center of restriction member 44, and connected at a top end thereof to an operation member. By rotating the operation member, the height of the mower can be adjusted. In other words, by rotating restriction member 44, the height of the upper surface of the restriction member 44 to abut against stopper 61 can be changed so as to regulate the rotational angle of mid rockshaft 56, thereby changing the height of the mid-mount mower, i.e., the lawn mowing height.

Alternatively, the outer peripheral surface of the restriction member may be formed into steps having different distances from the rotary axis of the restriction member. The steps are adapted to support the stopper so as to regulate the rotational angle of mid rockshaft 56.

Figure 9:
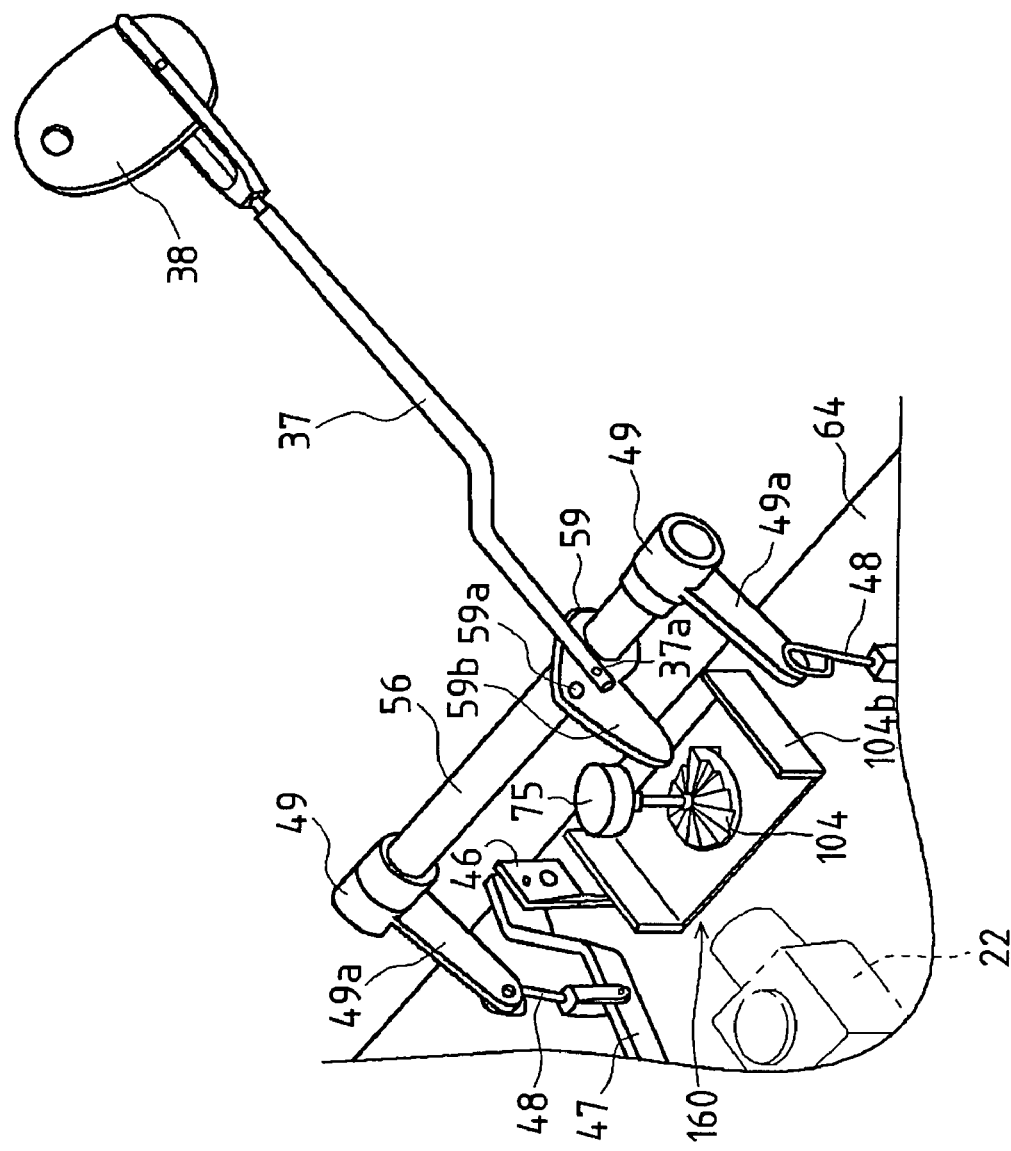
FIG. 9 is a side view of a mower lifting linkage for a mower tractor according to the second embodiment.
Figure 10:
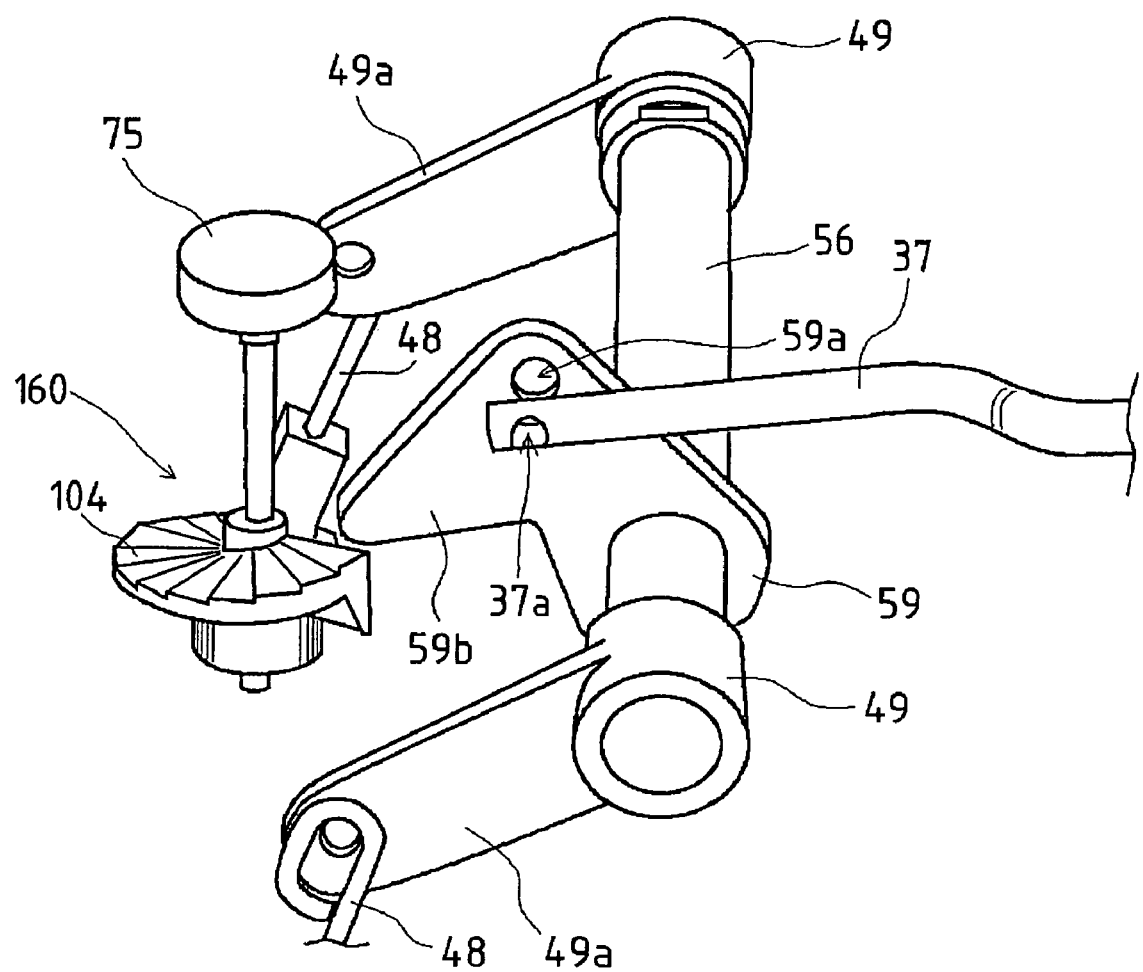
FIG. 10 is a perspective view of a mower height restricting device according to the second embodiment.

Another mower height restricting device 160 will now be described with reference to FIGS. 8 to 10.

Figure 8:
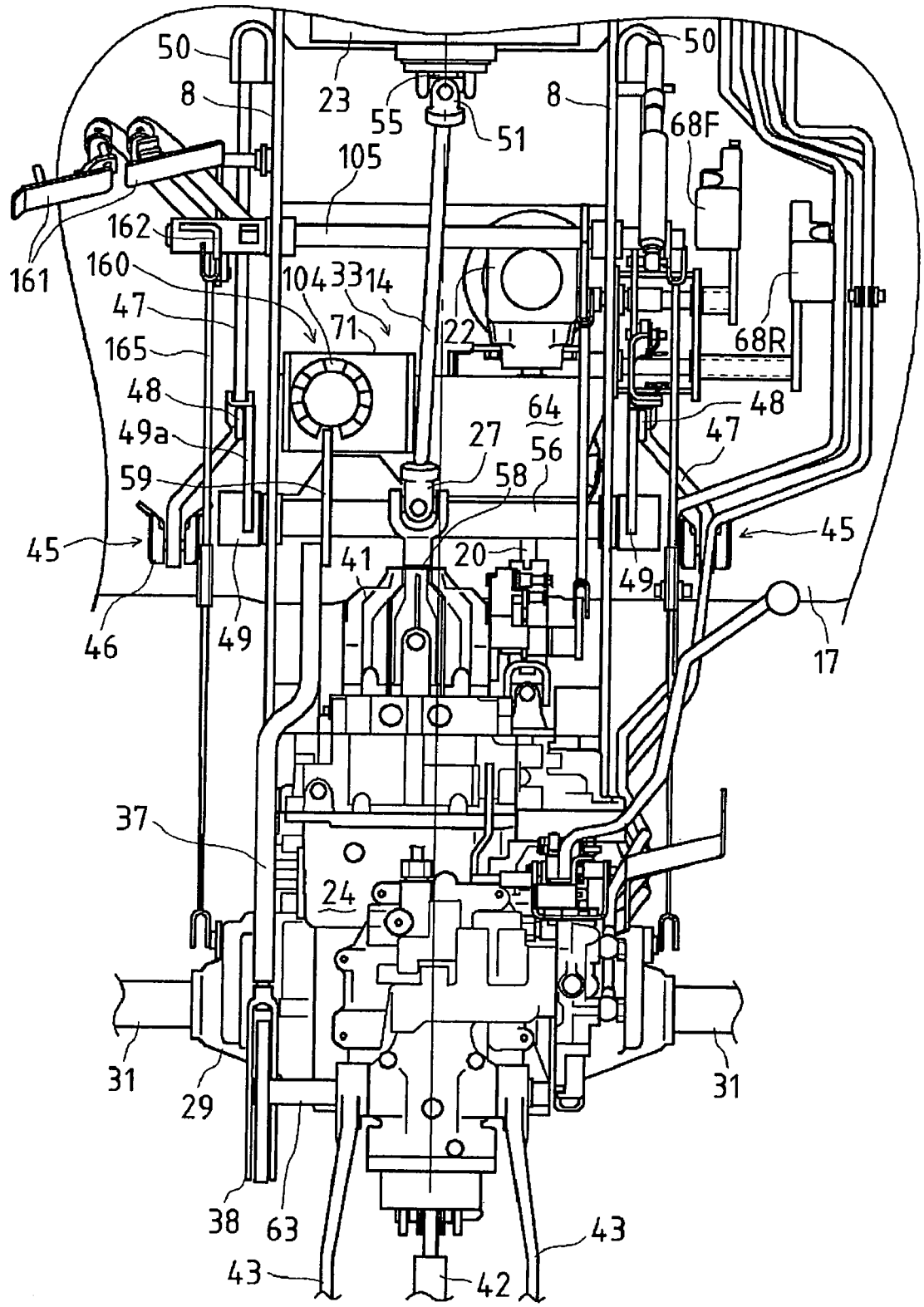
FIG. 8 is an enlarged plan view of arrangement in front of the transmission casing.

As shown in FIG. 8, plate-shaped reinforcing bracket 64 is fixedly spanned between the left and right portions of body frame 8 so as to strengthen the rigidity of body frame 8. A casing of mower height restricting device 160 is fixed on a leftward portion of reinforcing bracket 64, so that mower height restricting device 160 is disposed on the longitudinal axial line of mower lifting link 37. Cylindrical mid rockshaft 56 is spanned between the left and right portions of body frame 8. Connection plate 59 is fixed on the peripheral surface of mid rockshaft 56.

Connection plate 59 is substantially L-like shaped when viewed in side, and serves as a part of mower height restricting device 60. Connection plate 59 is disposed leftward in clutch housing 33 in the traveling direction of the tractor body, and at a position forwardly leftward from HST 41 disposed at the front portion of transmission casing 24. Universal joint 27 is disposed just above mid rockshaft 56. Propeller shaft 14 is interposed between universal joints 27 and 51. Output shaft 55 of engine 23 projects rearward at the lateral center of the tractor body, and input shaft 58 projecting from the front portion of HST 41 is offset leftward from the lateral center of the tractor body. Namely, HST 41 is disposed relatively leftward from the middle position between the left and right portions of body frame 8 so as to expand the space between propeller shaft 14 and the right portion of body frame 8.

Connection plate 59 is bent to have a pawl-like shaped portion, serving as an abutting portion 59b to abut against a restriction member 104, i.e., as the stopper of mower height restricting device 160. A pinhole 59a is bored in the bent portion of connection plate 59, and a pinhole 37a is bored in a tip portion of mower lifting link 37. A pin is passed through pin holes 59a and 37a so as to pivotally connect connection plate 59 to mower lifting link 37.

Restriction member 104 of mower height restriction device 160 is a substantially discoid member, which is rotatable centered on a regulation shaft 75 and has upper surfaces arranged like a spiral staircase gradually ascending or descending at regular heights in the rotational direction thereof. Restriction member 104 is rotatable integrally with regulation shaft 75. By rotating regulation shaft 75, restriction member 104 is rotated so that abutting portion 59b of connection plate 59 can abut against any of the upper surfaces of restriction member 104. The height of the upper surface to abut against abutting portion 59b defines the rotational angle of mid rockshaft 56 in the rotation direction for lowering the mower.

An alternative restriction member 114 may replace restriction member 104. Restriction member 114 is formed at the outer peripheral surface thereof with steps having different distances from the rotary axis thereof.

Figure 13:
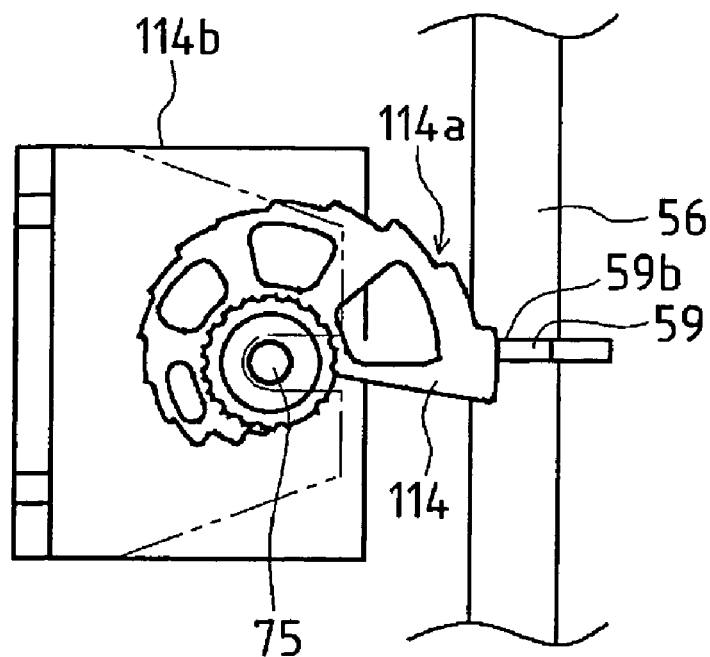
FIG. 13 illustrates a restricting member according to another embodiment.
Figure 13:
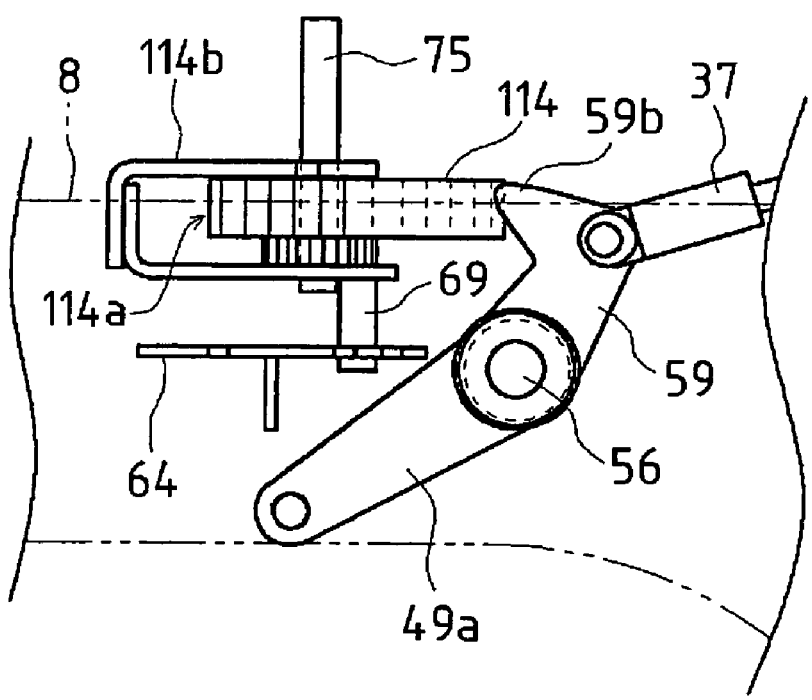

As shown in FIG. 13, restriction member 114 is disposed in a laterally turned U-like shaped casing 114b supported by a supporter 69 fixed on reinforcing bracket 64. Restriction member 114 has an outer peripheral portion 114a formed with steps having different distances from regulation shaft 75 serving as the rotary axis. In other words, outer peripheral portion 114a is stepped in the rotational direction of restriction member 114 so as to increase the radius of restriction member 114 at regular lengths. By rotating regulation shaft 75, restriction member 114 is rotated so as to change the position thereof to abut against abutting portion 59b of connection plate 59. In this way, the rotational position of connection plate 59 is changed so as to regulate the rotational angle of mid rockshaft 56, thereby regulating the height of the mower.

Since abutting portion 59b of connection plate 59, serving as the mid-mount mower lifting linkage, also serves as a part of mower height restricting device 160, the number of parts and the occupied space can be reduced in comparison with the case where component parts of the mower height restricting device are separated from those of the mid-mount mower lifting linkage. Further, a section to be welded can be reduced.

In the aforementioned embodiment, connection plate 59 is fixed on the leftward portion on mid rockshaft 56 between the left and right portions of body frame 8, so as to transmit power for elevating and lowering the mower. Alternatively, a connection arm 71 for transmitting power for elevating and lowering the mower may be disposed on the substantially axial middle portion of mid rockshaft 56.

Figure 11:
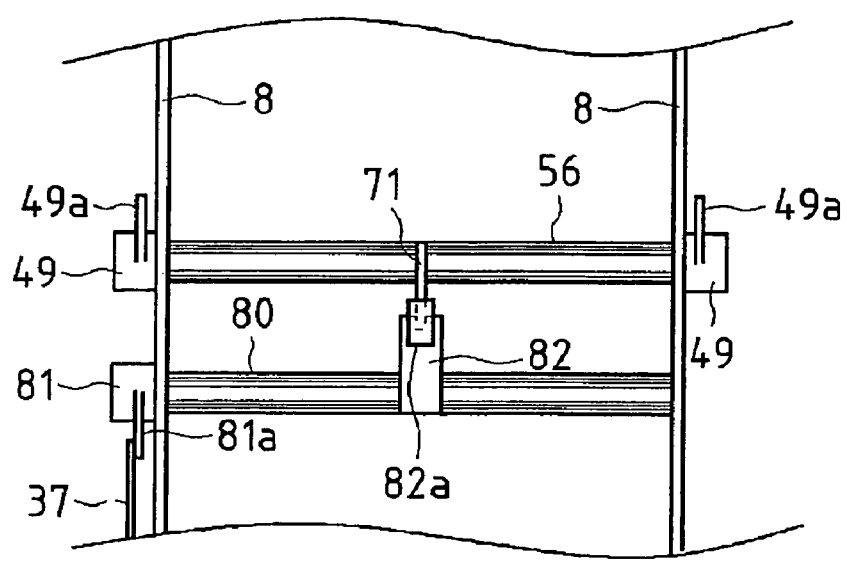
FIG. 11 is a schematic view of a mower lifting linkage according to another embodiment.
Figure 11:
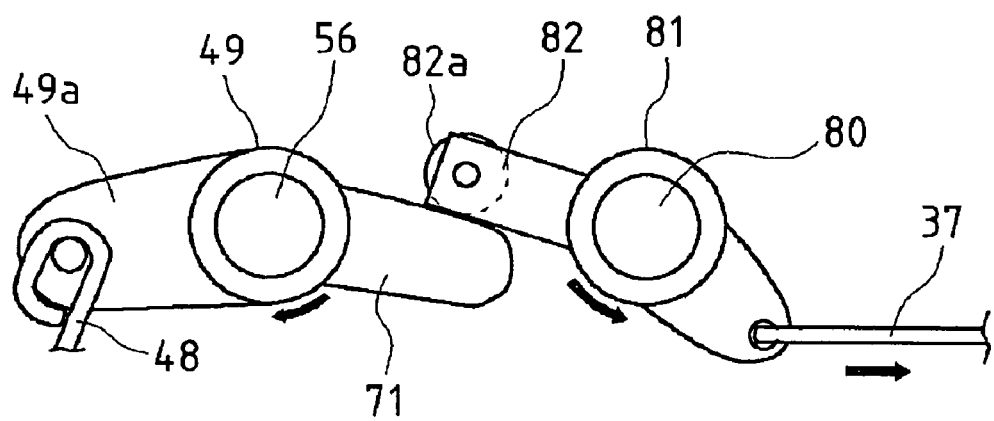

In this regard, as shown in FIG. 11, an intermediate shaft 80 is disposed behind mid rockshaft 56 in parallel. Left and right ends of intermediate shaft 80 project outward from the left and right portions of body frame 8. A boss portion of a sub link 81 is fixed on one of the left and right ends of intermediate shaft 80. A tip portion of sub link 81 is extended downwardly rearward and connected to mower lifting link 37. A hydraulic lift actuator (not shown) is connected to mower lifting link 37 so as to rotate intermediate shaft 80.

Connection arm 71 is extended downwardly rearward from the substantially lateral middle portion of mid rockshaft 56, and an intermediate arm 82 is extended forward from the lateral middle portion of intermediate shaft 80, so that a bearing 82a rotatably provided on the tip end of intermediate arm 82 abuts against connection arm 71. Rotation of intermediate shaft 80 rotates mid rockshaft 56 through connection arm 71 so as to elevate or lower the mid-mount mower.

Due to this construction, when lift arm 42 is rotated upward, mower lifting link 37 is pulled rearward so as to rotate intermediate arm 82 and connection arm 71 downward, thereby elevating the mid-mount mower. Mower lifting link 37 is prevented from being bent because the whole stress to mower lifting link 37 is tensile stress.

The connection of connection arm 71 and intermediate arm 82 through bearing 82a can reduce friction resistance between arms 71 and 82 so as to smoothly rotate shafts 56 and 80, and prevents connection plate 59 and intermediate arm 82 from being damaged, whereby plate 59 and arm 82 require no processing for prevention of damage, such as boring of slots.

Since the power transmission for elevating and lowering the mower is performed at the substantially axial middle of mid rockshaft 56, mid rockshaft 56 is prevented from being twisted, thereby leveling elevated and lowered mid-mount mower 5. Further, since sub link 81 connected to one end of intermediate shaft 80 is disposed outside body frame 8, mower lifting link 37 is prevented from interfering with the transmission casing, and the inside space of body frame 9 is expanded.

A brake linkage between a brake pedal 61 and a brake device will now be described.

As shown in FIG. 8, a brake pedal 161 is disposed at a position downwardly leftward from driver's seat 7. Brake pedal 161 is connected to a long rod 165 through a brake arm 162, thereby being connected to the brake device (not shown) disposed at the rear portion of the tractor body.

Brake pedal 161 is rotatable centered on a pivot shaft 105 pivoted onto body frame 8. Brake arm 162 is fixed on a left end portion of pivot shaft 105, and connected to long rod 165. Long rod 162 is extended rearward along the left portion of body frame 8, and connected to a braking actuator through a cam lever shaft.

By depressing brake pedal 161, the braking actuator is rotated to activate the brake device so as to brake rear wheels 3.

With respect to the brake linkage for the brake device, in the case where mid rockshaft 56 is rotated for elevating and lowering mid-mount mower 5, the bake linkage interferes with intermediate link 48 serving as a metal hanging mid-mount mower 5. Further, when the brake linkage is disposed at a high position, pivot shaft 105 of brake pedal 161 becomes high so as to narrow the space between pivot shaft 105 and the body frame, so that brake arm 62 at the left end portion of pivot shaft 105 may interfere with the body frame.

Figure 12:
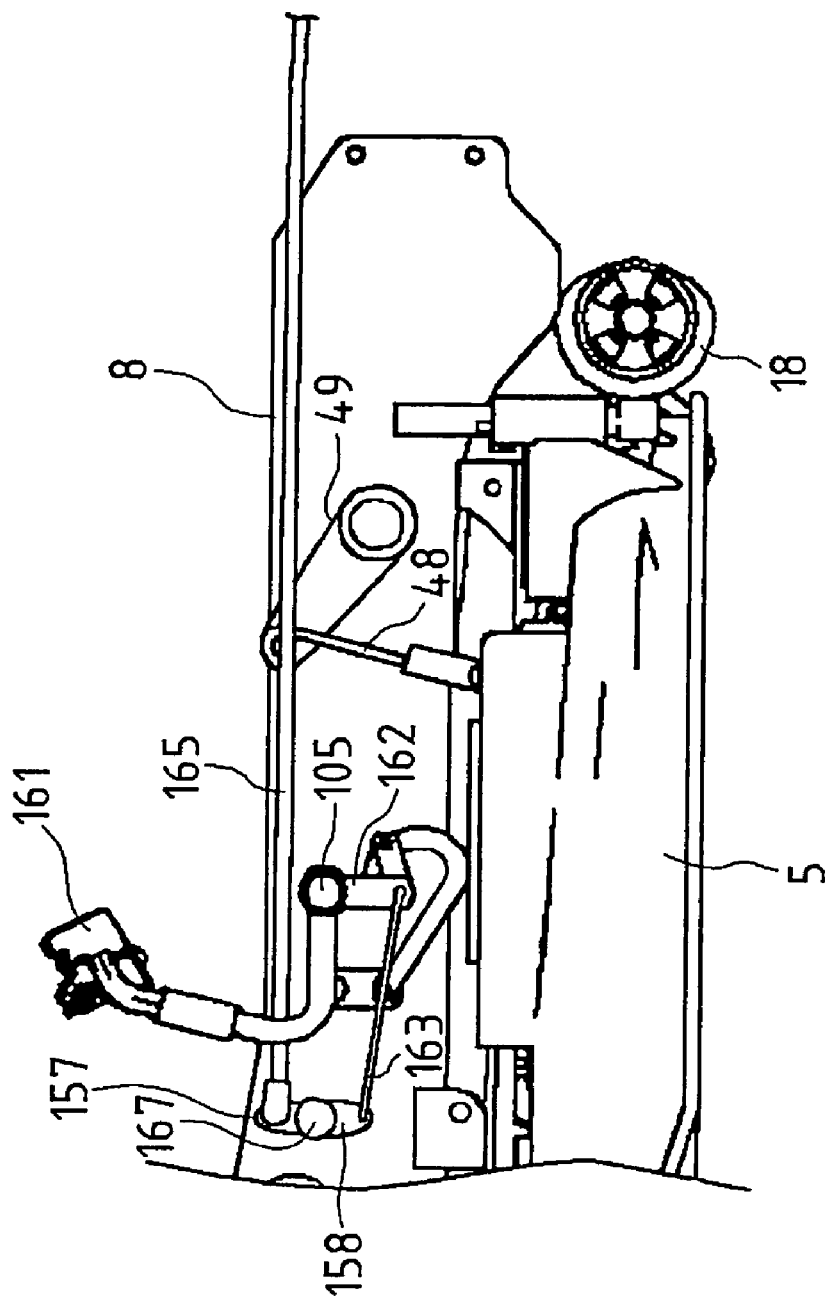
FIG. 12 is a schematic view of a linkage of a brake device.

Therefore, as shown in FIG. 12, a second pivot shaft 167 is provided in addition to pivot shaft 105 of brake pedal 161 so as to prevent the brake linkage from interfering with the body frame.

In this regard, second pivot shaft 167 is disposed on the body frame in front of pivot shaft 105 of brake pedal 161. Second pivot shaft 167 is fixedly provided on one end portion thereof with a bracket 158. A brake arm 158 projects downward from pivot shaft 105, and is connected to bracket 158 through a wire 163 or the like. A second bracket 157 is provided on the other end portion of second pivot shaft 167 opposite to bracket 158, and connected to long rod 158 so as to constitute the brake linkage.

Since long rod 165 is connected to brake arm 162 on second pivot shaft 167 provided in addition to pivot shaft 105 of brake pedal 161, the brake linkage can be disposed higher so as to make the space more useful. Brake arm 162 prevented from interfering with the body frame can be extended longer so as to improve reliability of the brake linkage.

Arrangement of the engine will now be described.

Figure 14:
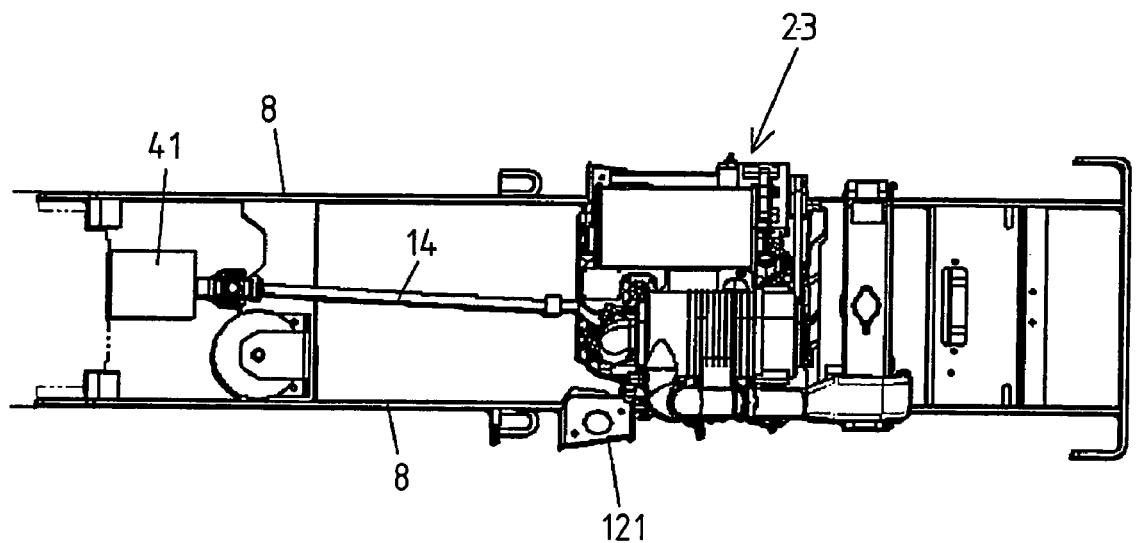
FIG. 14 is a plan view of arrangement of an engine in relation to the body frame.
Figure 15:
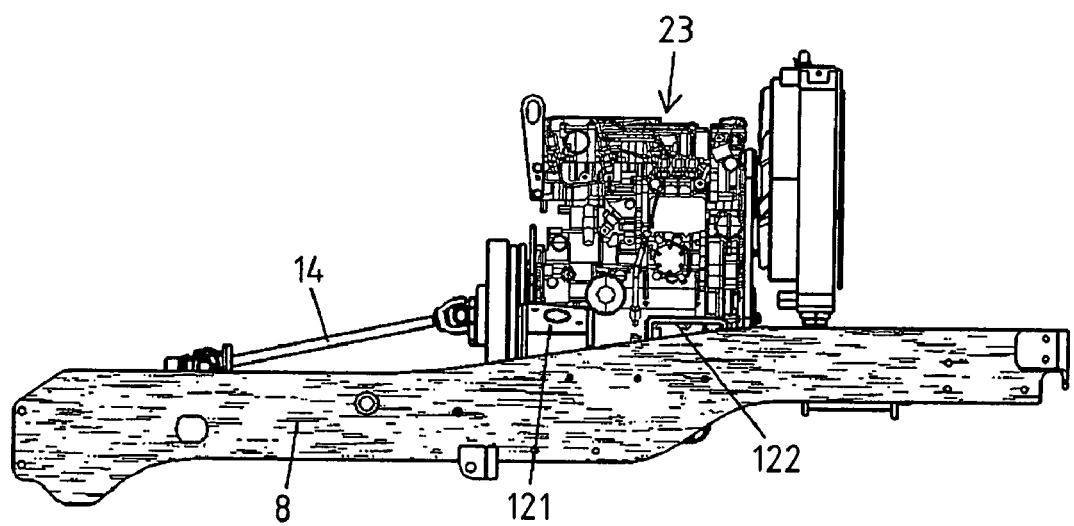
FIG. 15 is a side view of the arrangement of the engine in relation to the body frame.
Figure 16:
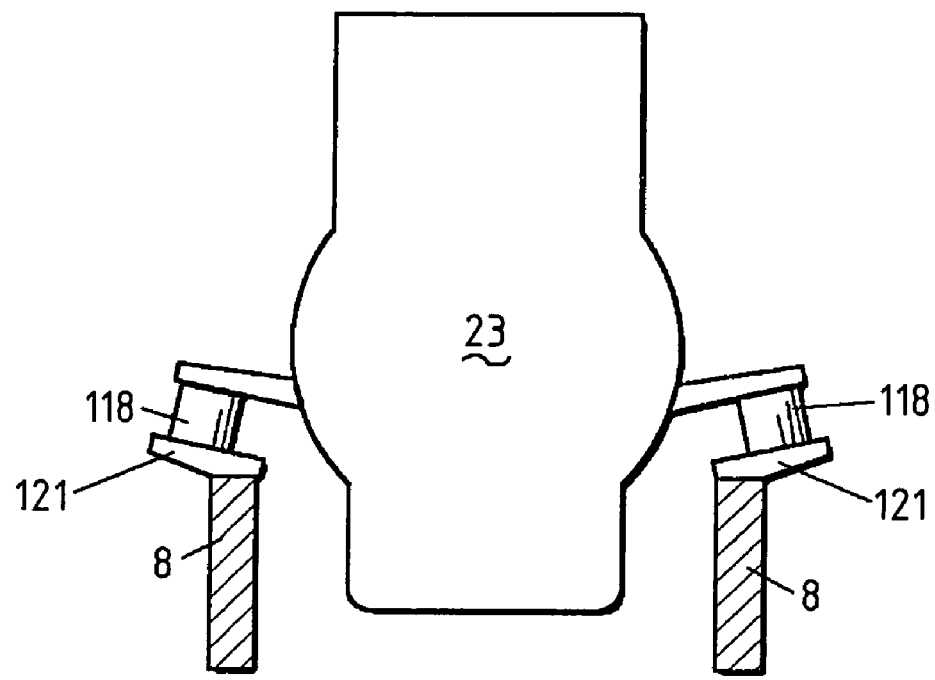
FIG. 16 is a rear view of the arrangement of the engine in relation to the body frame.

FIG. 14 is a plan view of arrangement of an engine in relation to the body frame, FIG. 15 is a side view of the arrangement, and FIG. 16 is a rear view of the arrangement.

Body frame 8, belonging to the ladder frame type, has the pair of left and right plate members extended in the fore-and-aft direction, and a connection member connecting the left and right plate members to each other. Engine 23 is mounted on the substantially fore-and-aft middle portion of body frame 8. In this regard, a pair of stays 121 and a pair of stays 122 are provided on upper portions of body frame 8. Engine.23 is supported at the front portion thereof through vibro-isolating rubbers on stays 121, and fixed to body frame 8 through stays 122.

Engine 23 is connected to stays 122 through highly rigid joint members 118, which may be made of aluminum. In this way, engine 23 is fixed at the rear portion thereof to body frame 8 through joint members 118.

In this way, engine 23 is vibro-isolatingly supported at the front portion thereof onto body frame 8, and is rigidly mounted at the rear portion thereof onto body frame 8. Namely, engine 23 to be supported onto body frame 8 at four points is fixed onto body frame 8 at the two points on the output side (or the flywheel side) thereof, thereby preventing misalignment between engine 23 and the propeller shaft, and thereby reducing noise and vibration. Further, the amplitude of vibration of engine 23 caused when being suddenly accelerated or decelerated can be reduced so as to increase design freedom in arrangement of electric equipments or piping, and to enable compact arrangement of engine 23.

Further, the restriction of engine vibration adjacent to the flywheel having a large rotational moment can reduce stress on the output shaft bearing portion adjacent to the flywheel. The gyro-dynamic flywheel does not have to be moved very much, thereby improving reliability of the engine.

Arrangement of operation pedals will now be described.

Figure 17:
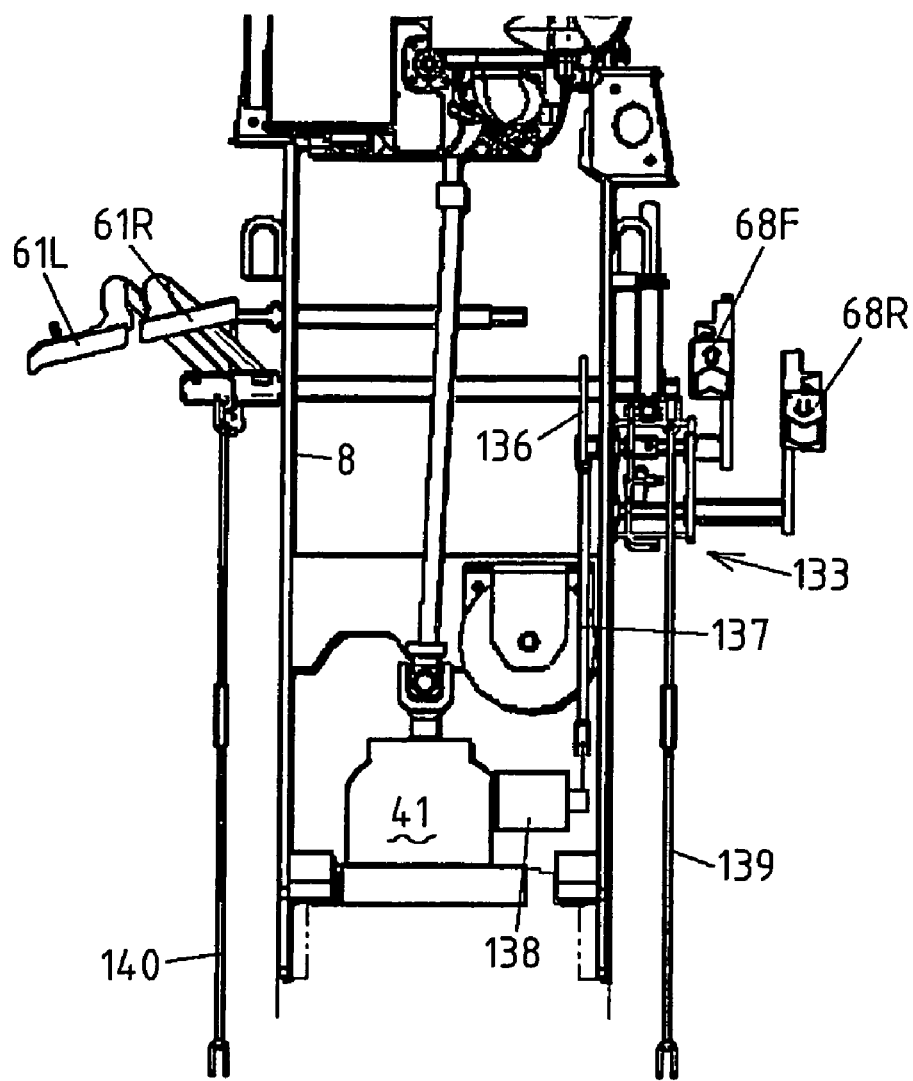
FIG. 17 is a plan view of arrangement of operation pedals.

FIG. 17 is a plan view of arrangement of operation pedals.

Brake pedals 61L and 61R and accelerator pedals 68F and 68R are distributed into left and right sides of body frame 8. Brake pedals 61L and 61R are juxtaposed laterally, and connected through the brake linkage to the brake device of the rear wheels. By depressing brake pedal 61L, a rod 140 connected to the brake for the left rear wheel is slid so as to brake the left rear wheel. Similarly, by depressing brake pedal 61R, a rod 139 is slid to brake the right rear wheel.

Accelerator pedals 68F and 68R are attached onto an outer side surface of body frame 8 through an accelerator pedal connection portion 133. Accelerator pedal connection portion 133 is connected to an operation portion 138 of HST 41 through a linkage, so that HST 41 can be operated for speed change in reaction to depression of accelerator pedal 68F or 68R. Accelerator pedal connection portion 133 is provided with an arm 136, which is connected to HST operation portion 138 through a rod 137. The depression of accelerator pedal 68F or 68R is transmitted to arm 136 through accelerator pedal connection portion 133, so as to operate HST 41.

Arm 136 is disposed inside body frame 8, so that rod 137 connecting arm 136 to HST operation portion 138 can be disposed along the inside surface of body frame 8, thereby enabling compact arrangement of HST operation portion 138. Body frame 8 surely protects the linkage from arm 136 to HST operation portion 138. The speed-changing linkage between arm 136 and HST operation portion 138 inside body frame 8 can be surely prevented from interfering with the working machine lifting linkage while a working machine such as the mid-mount mower is attached to the working machine lifting linkage.

Ratchet-shaped arm 136 is adapted to retain depressed accelerator pedal 68F or 68R at the depression angle so as to keep the traveling speed of the tractor. Arm 136 for keeping the depression angle of accelerator pedal 68F or 68R is also used for operating HST 41, so as to reduce the number of parts. In this way, the HST operation mechanism including the angle-keeping mechanism can be compacted so as to ensure a sufficiently large useful space inside body frame 8.

Accelerator pedals 68F and 68R and arm 136 will now be detailed.

Figure 18:
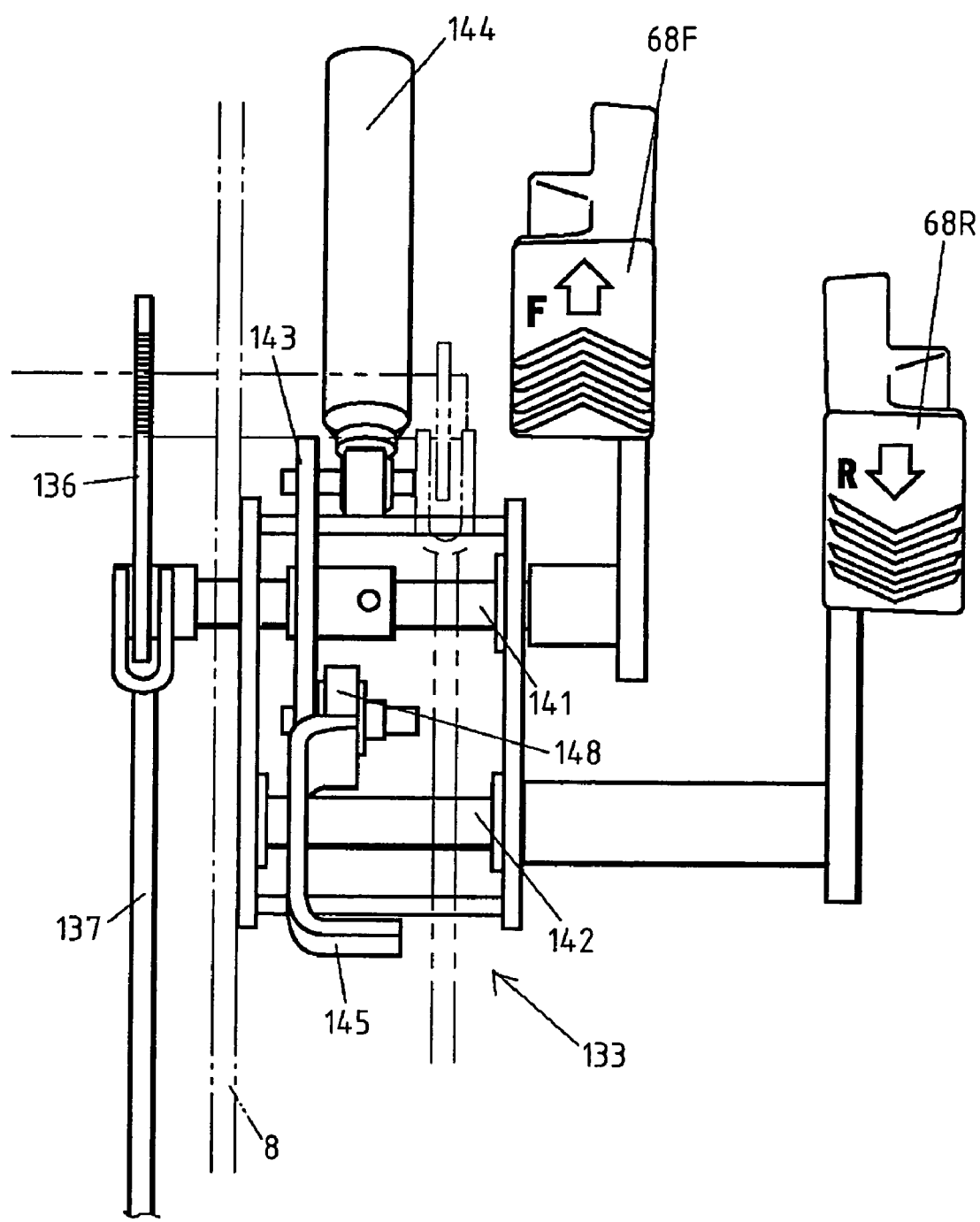
FIG. 18 is a plan view of arrangement of accelerator pedals.
Figure 19:
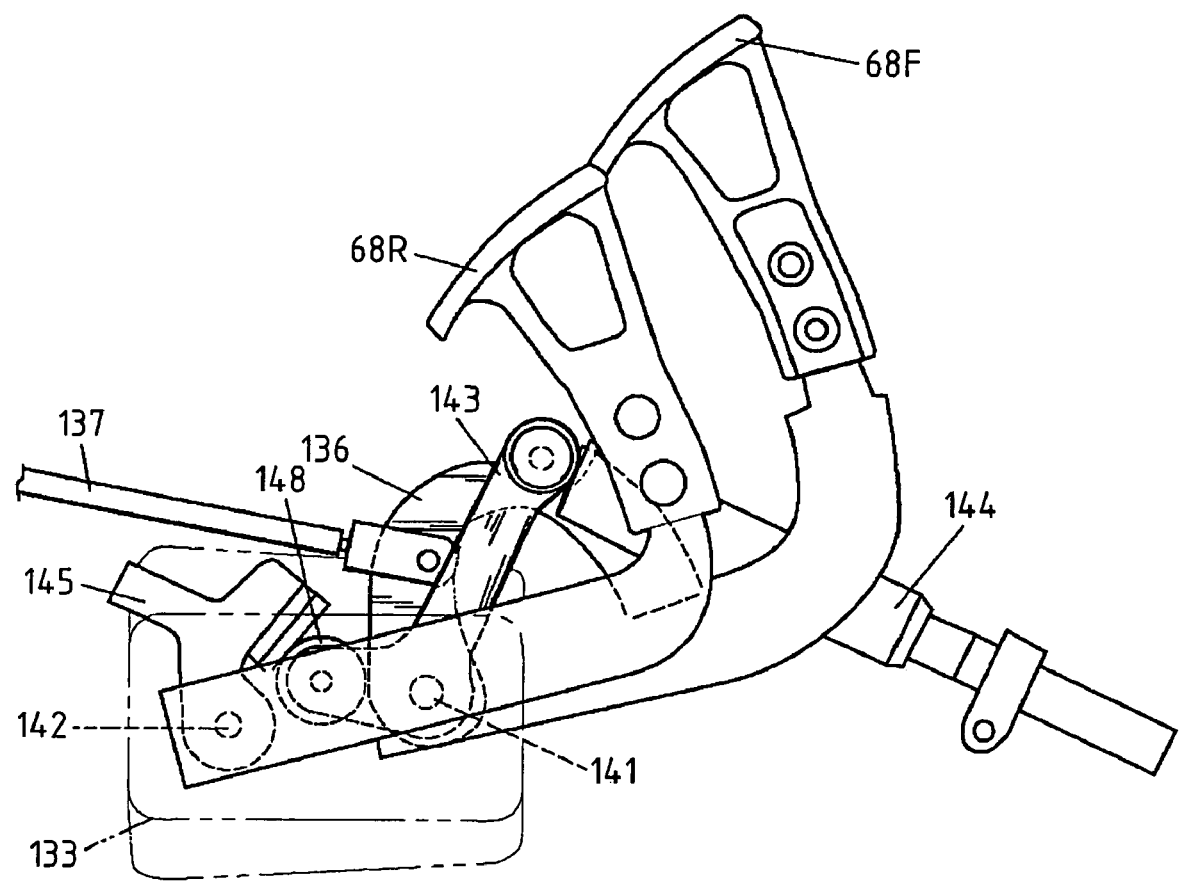
FIG. 19 is a side view of the arrangement of the accelerator pedals.

FIG. 18 is a plan view of arrangement of the accelerator pedals, and FIG. 19 is a side view of the arrangement.

Accelerator pedal 68F for forward traveling is fixed on a support shaft 141. An L-like shaped arm 143 and arm 136 are fixed on support shaft 141, so that accelerator pedal 68F, L-like shaped arm 143 and arm 136 are integrally rotatable.

Accelerator pedal 68R for rearward traveling is fixed on a support shaft 142. An abutting arm 145 is fixed on support shaft 141, so that accelerator pedal 68R and abutting arm 145 are integrally rotatable.

L-like shaped arm 143 is fixed at the angled portion thereof onto support 142, connected at the front end thereof to a damper 144, and relatively rotatably provided at the rear end thereof with a roller 148. The damper connected to the front end of arm 143 can easily prevent the speed-changing linkage from interfering with the working machine lifting linkage while a working machine such as the mid-mount mower is attached to the working machine linkage.

Roller 148 abuts against abutting lever 145 disposed behind L-like shaped arm 143. L-like shaped arm 143 and abutting arm 145 are disposed in accelerator pedal connection portion 133.

Damper 144 is connected to L-like shaped arm 143 so as to prevent the accelerator pedal from rapidly returning to the neutral position, thereby preventing hydro-braking action of the HST caused by the rapid neutral-returning of the HST.

The operational mechanism of accelerator pedals 68F and 68R and arm 136 will now be described.

Figure 20:
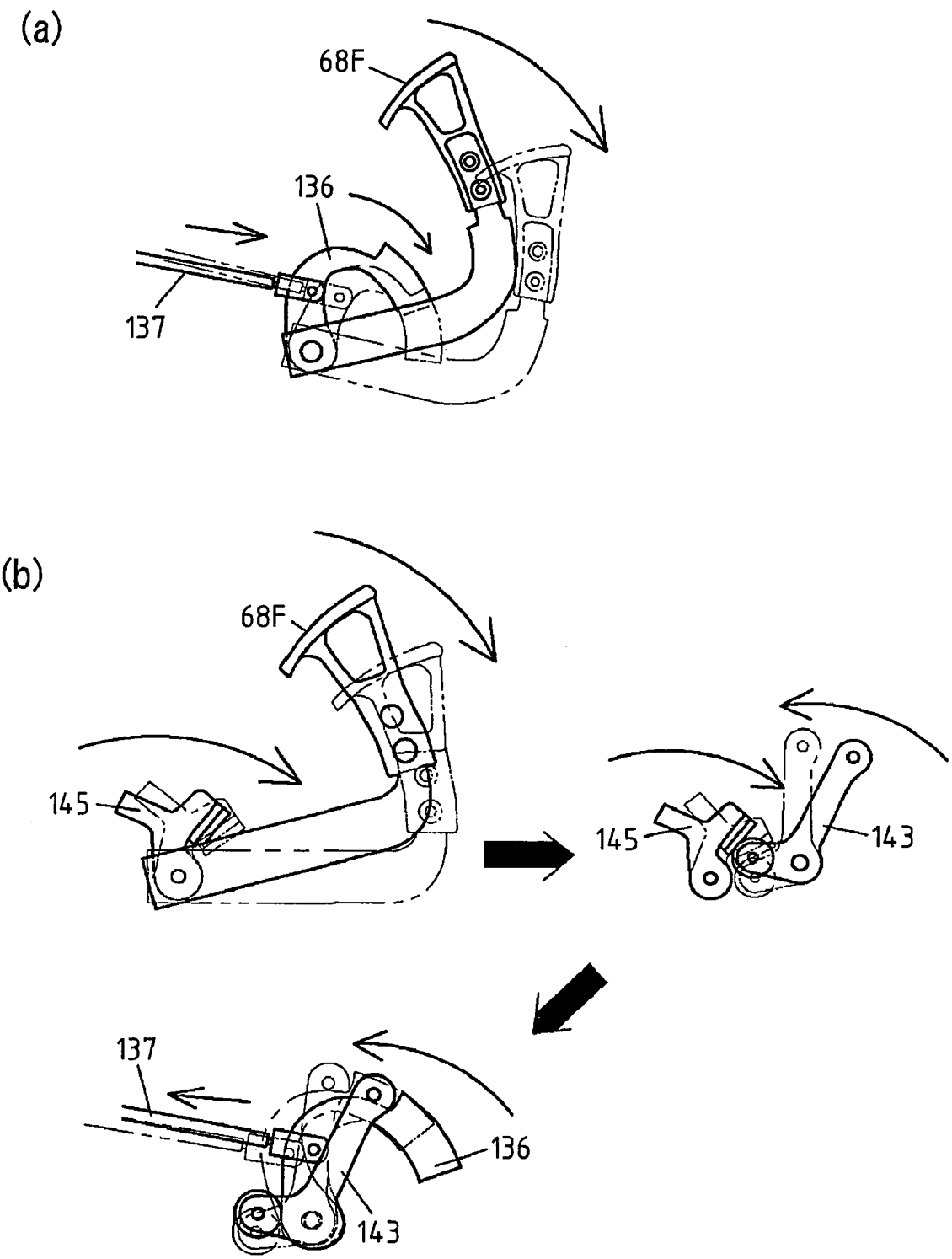
FIG. 20 illustrates a mechanism for operating the accelerator pedal.

FIG. 20 illustrates a mechanism for operating the accelerator pedal. FIG. 20(a) is a view of the mechanism during operation for forward traveling, and FIG. 20(b) is a view of the mechanism during operation for backward traveling.

As shown in FIG. 20(a), when forward traveling accelerator pedal 68F is depressed, arm 136 is rotated forward together with accelerator pedal 68F, thereby forwardly moving rod 137 connected between arm 136 and the HST operation portion, and putting the HST into a forward traveling speed setting state.

As shown in FIG. 20(b), when backward traveling accelerator pedal 68R is depressed, abutting arm 145 abutting against roller 148 of L-like shaped arm 143 is rotated forward together with accelerator pedal 68R so as to rearwardly rotating L-like shaped arm 143, which is rotatable integrally with arm 136. Accordingly, by depressing accelerator pedal 68R, arm 136 is rotated rearward so as to rearwardly moving rod 137, thereby putting the HST into a backward traveling speed setting state.

A device for keeping the depression angle of the accelerator pedal will be described.

Figure 21:
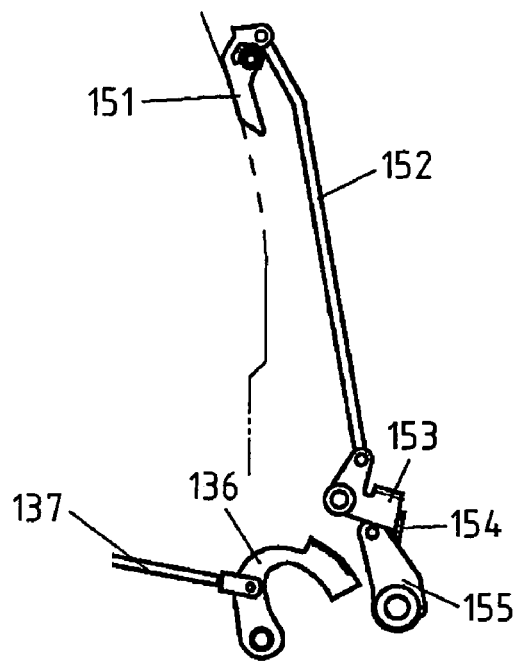
FIG. 21 illustrates a mechanism of a speed-keeping device.
Figure 21:
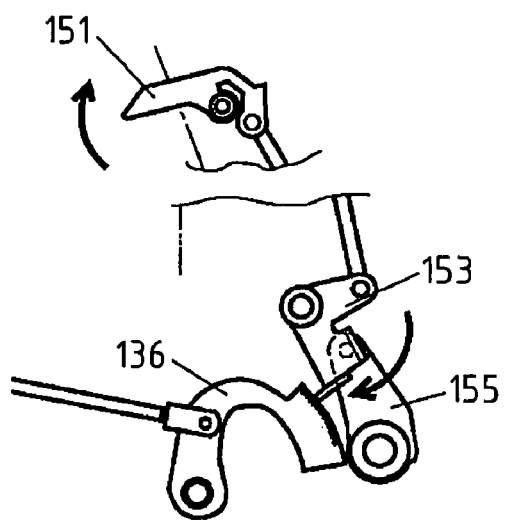
Figure 21:
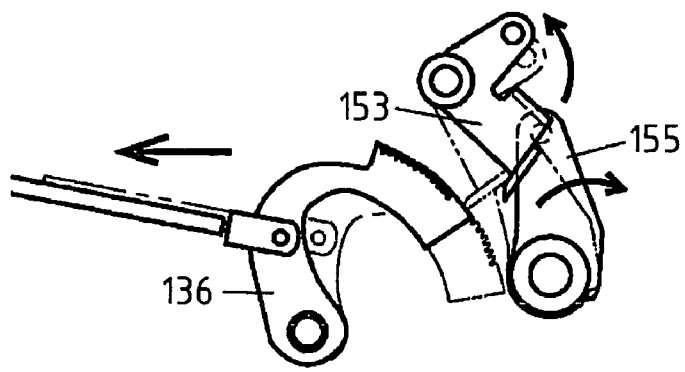

FIG. 21 illustrates a speed-keeping device.

The speed-keeping device comprises a speed-keeping lever 151, a pawl 154 for retaining arm 136, and a releasing arm 155 for disengaging pawl 154 from arm 136. Speed-keeping lever 151 is disposed in the front column below the steering wheel, and connected onto a top end of a rod 152. Rod 152 is connected at the bottom end thereof to one end of pivotal stay 153. Pawl 154 adapted to engage with arm 136 is provided on stay 153. Stay 153 is disposed between the left and right portions of body frame 8. A front upper portion of arm 136 is toothed so as to engage with pawl 154.

Since stay 153 is disposed between the left and right portions of body frame 8, body frame 8 protects the speed-keeping device while saving the number of parts, and ensures stable action of the speed-keeping device.

When the speed-keeping device is set in a releasing state, as shown in FIG. 21(a), speed-keeping lever 151 is held in the downwardly rotated state, where pawl 154 is disengaged from arm 136.

When speed-keeping lever 151 is rotated upward, as shown in FIG. 21(b), rod 152 moves downward so as to rotate stay 153 downward, whereby pawl 154 provided on stay 153 comes to engage with arm 136 so as to retain arm 136. Since arm 136 is connected to the HST operation portion, the biasing force for returning the HST operation portion to the neutral position is constantly applied onto arm 136.

The speed-keeping operation state can be canceled by operation for braking. In this regard, pawl 154 is disengaged from arm 136 by arm 155 interlocking with the brake operation means. Arm 155 interlocks with the brake pedal. Arm 155 is rotated forward by depressing the brake pedal. Stay 153 holding pawl 154 is bent to have a portion, which is extended toward arm 155 and adapted to abut against a tip projection of arm 155. Therefore, as shown in FIG. 21(c), when arm 155 is rotated forward, the projection of arm 155 abuts against stay 153 so as to rotate stay 153 upward, thereby releasing pawl 154 from arm 136, and canceling the speed-keeping operation state.

An alternative speed-keeping arm will now be described.

Figure 22:
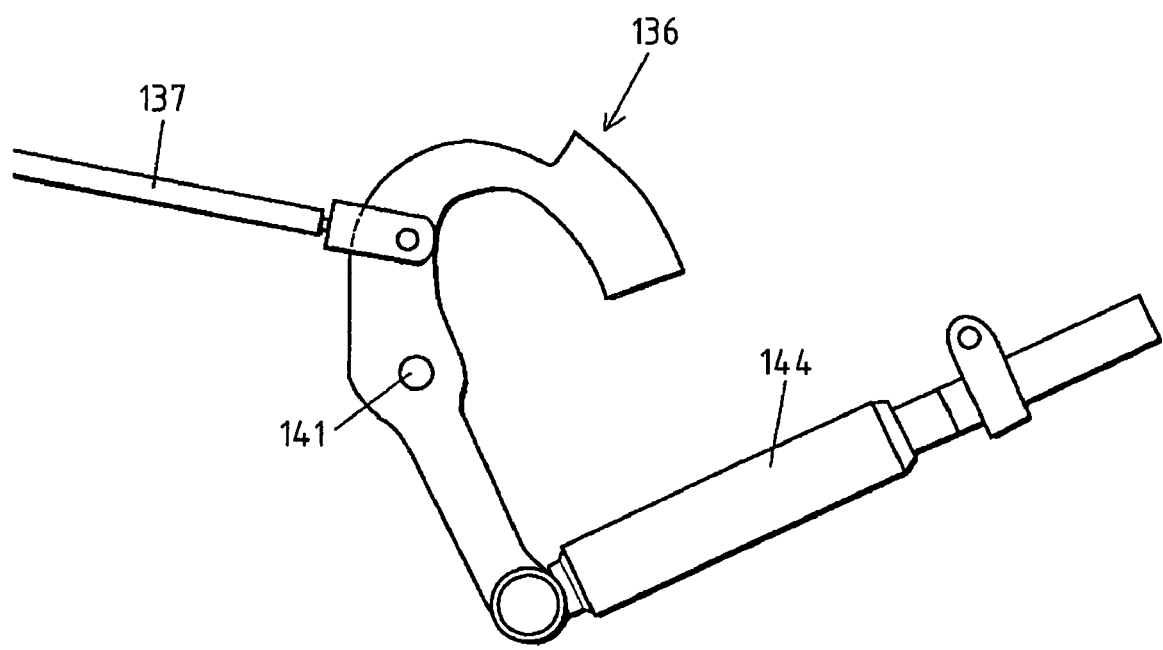
FIG. 22 is a side view of an arm of the speed-keeping device.

FIG. 22 is a side view of an arm of the speed-keeping device.

As shown in FIG. 22, an alternative arm 136 may be connected to damper 144 so as to constitute the speed-keeping device. Arm 136 simplifies other members for speed-changing operation, and reduces the number of parts. Since arm 136 connected to the HST operation portion is connected to damper 144, resistance caused by friction loss or the like is reduced so as to facilitate adjustment of damper 144. Further, the reduction of friction loss can maintain the stable depression feeling of the pedals.

Alternative arrangement of accelerator pedal connection portion 133 will be described.

Figure 23:
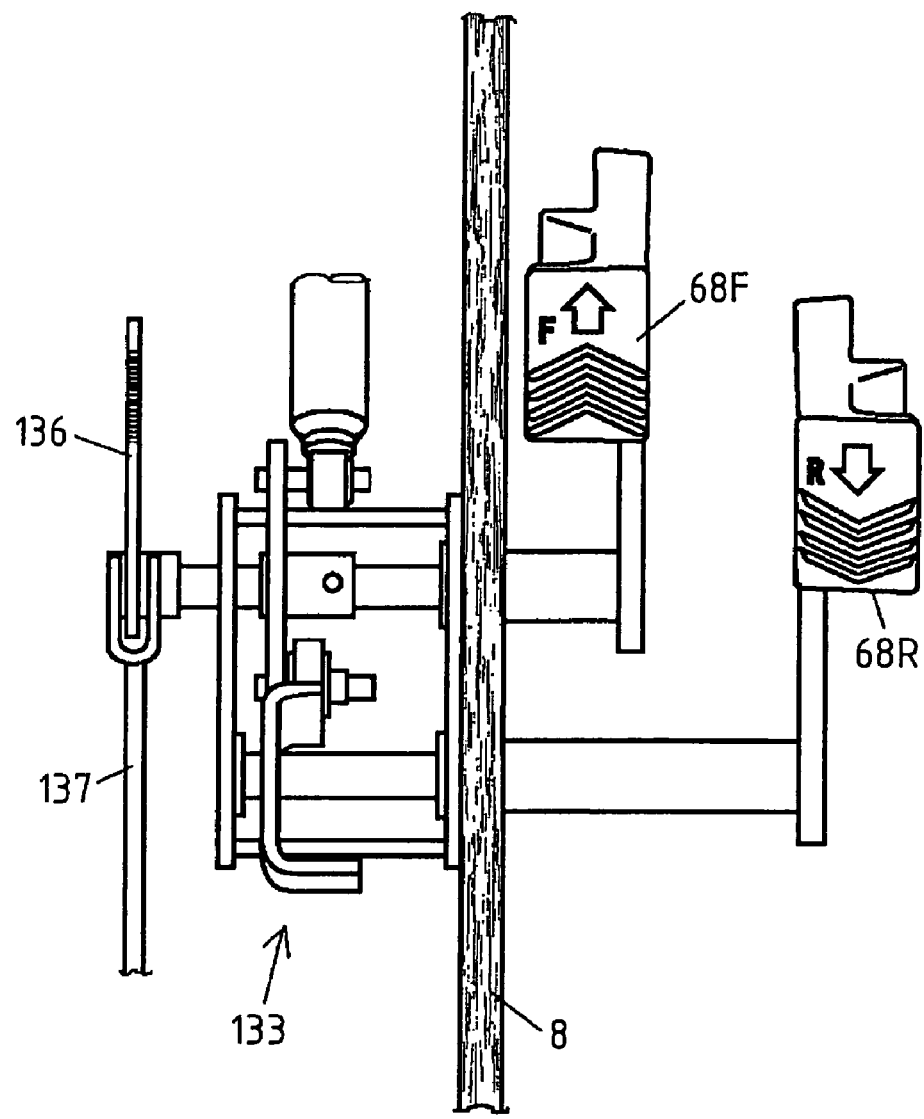
FIG. 23 is a plan view of a portion connected to the accelerator pedals according to another embodiment.

FIG. 23 is a plan view of the alternative accelerator pedal connection portion.

In this embodiment, accelerator pedal connection portion 133 is disposed inside body frame 8. While accelerator pedals 68F and 68R are disposed outside body frame 8, accelerator pedal connection portion 133 is fixed onto the inside surface of body frame 8. Therefore, body frame 8 directly receives stress applied on accelerator pedal 68F or 68R, so as to reduce stress onto pedal connection portion 133.

Due to this arrangement, the construction outside body frame 8 can be simplified so as to facilitate setting of the lifting device or the like for attaching a working machine such as the mid-mount mower.

The brake system will now be described.

Figure 24:
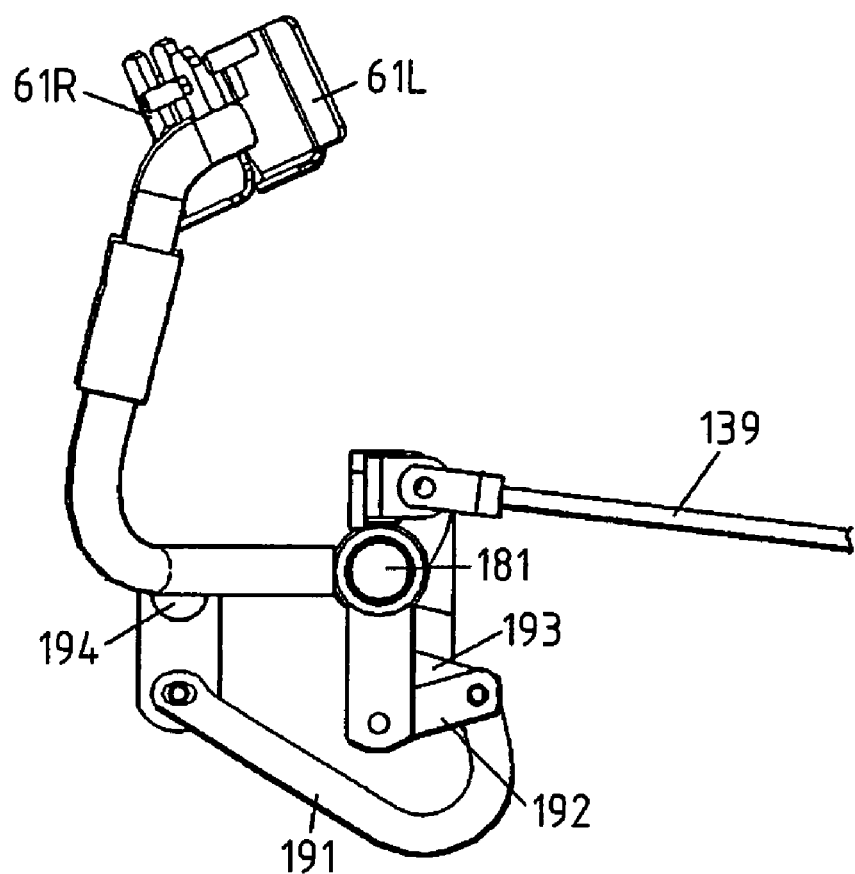
FIG. 24 is a side view of arrangement of brake pedals.
Figure 25:
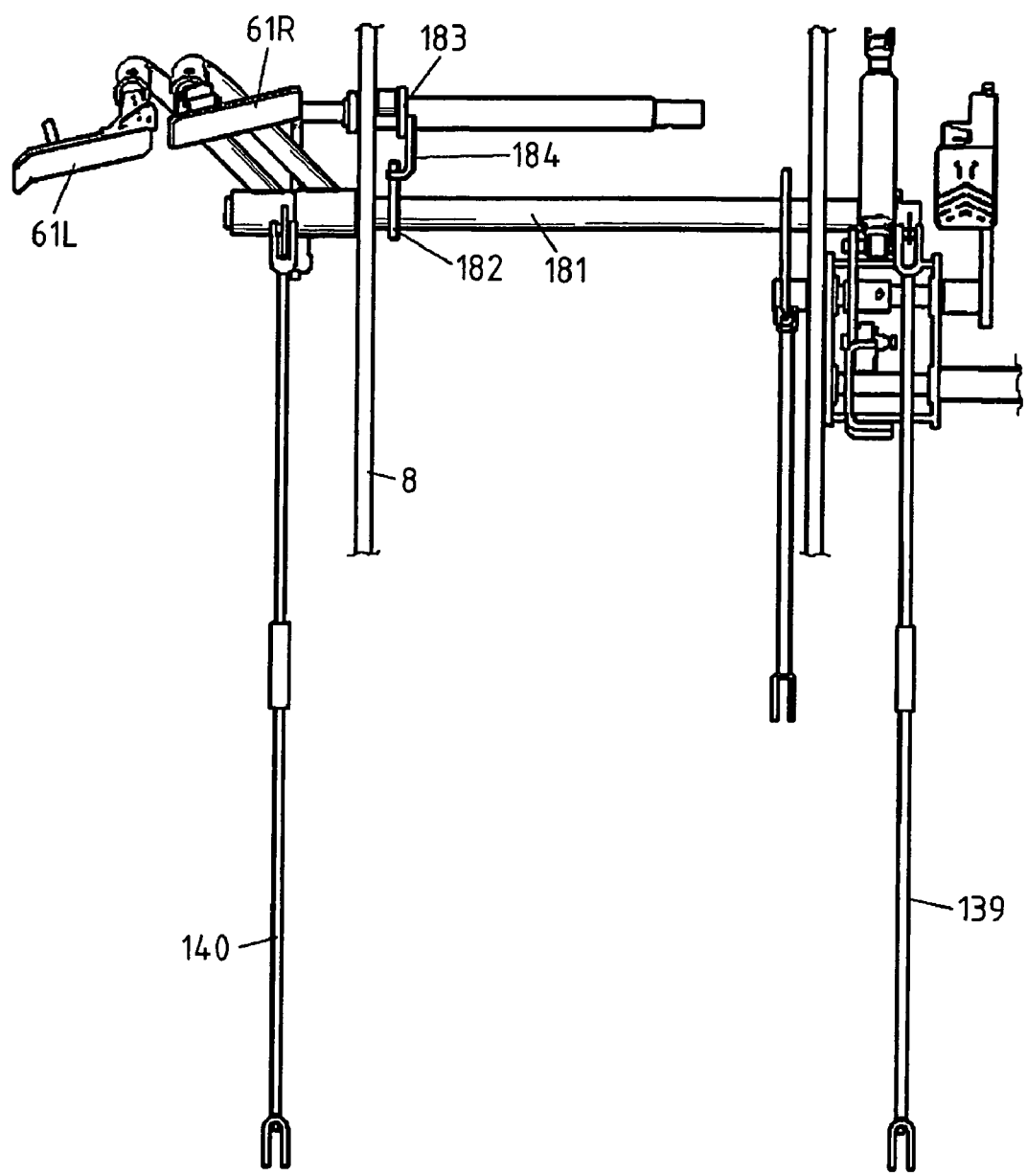
FIG. 25 is a plan view of the arrangement of the brake pedals.

FIG. 24 is a side view of arrangement of the brake pedals, and FIG. 25 is a plan view of the arrangement.

Brake pedals 61L and 61R are disposed outside body frame 8. Brake pedal 61L is relatively rotatably supported on a support shaft 181. Brake pedal 61R is fixed on support shaft 181 so as to be rotatable integrally with support shaft 181. Support shaft 181 is rotatably spanned between the left and right portions of body frame 8.

An arm is provided on a base portion of brake pedal 61L, and extended upwardly rearward, so as to transmit movement of brake pedal 61L to rod 140. Brake pedal 61R is fixed on one end of support shaft 181. An arm is provided on the other end of support shaft 181, extended upwardly rearward, and connected to rod 139 so as to transmit movement of brake pedal 61R to rod 139. Rods 140 and 139 are connected to the respective brake devices of the rear wheels, and slid to brake the respective left and right rear wheels.

Arms are extended downward from the respective base portions of brake pedals 61L and 61R, and connected to respective connection members 192 and 193. Both connection members 192 and 193 are connected to a plate 191 connected to an arm fixed on a support shaft 194. Support shaft 194 is fixedly provided with releasing arm 155 of the speed-keeping device. By rotating support shaft 194, releasing arm 155 is rotated so as to cancel the speed-keeping operation. Connection members 192 and 193 are connected to the respective arms extended downward from brake pedals 61L and 61R through slots bored in the respective arms, so that, when one of the brake pedals is depressed, plate 191 slides rearward to rotate support shaft 194. In this way, the speed-keeping operation is canceled by depressing brake pedal 61L or 61R.

A parking brake system will now be described.

Figure 26:
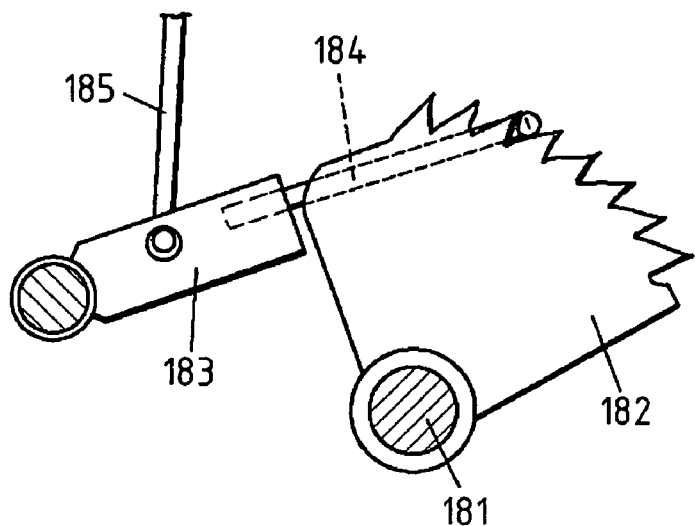
FIG. 26 illustrates a parking brake device.
Figure 26:
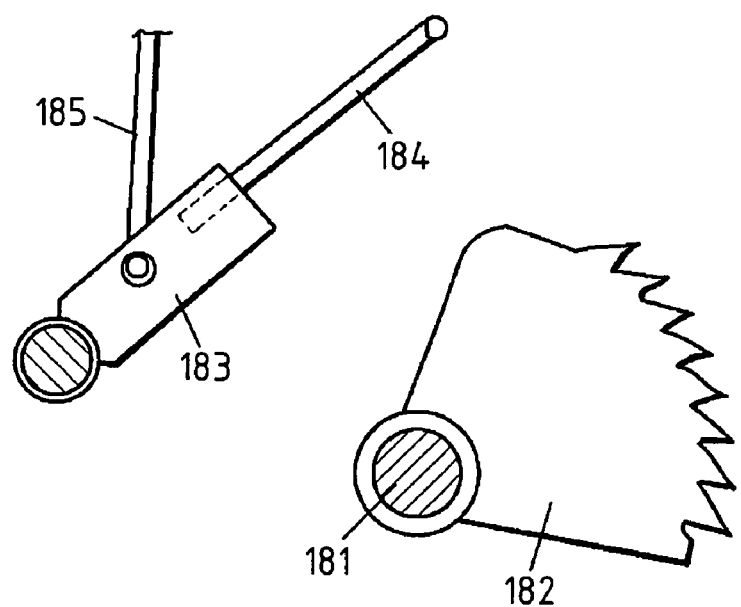

FIG. 26 illustrates a parking brake device. FIG. 26(*a*) is a view of the parking brake device operated for braking, and FIG. 26(*b*) is a view of the parking brake device canceling the braking operation.

Brake pedal 61R can be engaged with brake pedal 61L. By engaging brake pedal 61R with brake pedal 61L, brake pedals 61L and 61R become integrally rotatable. In this state, when brake pedals 61L and 61R are depressed, support shaft 181 is rotated, and retained at the rotational angle, thereby functioning as a parking brake.

A plate 182 is fixed on support shaft 181, and extended perpendicularly to support shaft 181. Plate 182 is rotatable integrally with support shaft 181, and toothed on the peripheral edge thereof for the engagement.

An arm 183 is disposed in front of plate 182. Arm 183 is rotatably supported inside body frame 8, and an engaging member 184 is fixed on a tip of arm 183. Engaging member 184 is an L-like shaped rod whose tip portion is formed for engagement with plate 182. When plate 182 is engaged with engaging member 184, support shaft 181 is retained at the rotational position thereof, thereby acting as the parking brake.

Arm 183 is connected to a rod 185, so as to be rotated in the fore-and-aft direction in correspondence to the vertical slide of rod 185. Rod 185 is connected to a parking brake lever (not shown). While the brake pedals are depressed, the parking brake lever is manipulated for activating the parking brake.

When the paring brake lever is operated to lower rod 185, arm 183 rotates downward so as to engage engaging member 184 with the toothed portion of plate 182. Consequently, the rearward rotation of plate 182 is restrained, so as to establish the parking braking state, as shown in FIG. 26(*a*).

When the parking brake lever is operated to raise rod 185, arm 183 rotates upward and disengage engaging member 184 from plate 182, thereby canceling the parking brake, as shown in FIG. 26(*b*).

In this way, plate 182 serving as the latch for parking brake is disposed between the left and right portions of body frame 8, and support shaft 181 serving as the brake shaft is exposed between the left and right portions of body frame 8. Support shaft 181 is rotatably supported through bushes or the like onto body frame 8, so as to simplifying the brake operation mechanism. Engaging member 184 to be engaged with plate 182 serving as the latch is disposed between the left and right portions of body frame 8.

In this way, the brake operation mechanism and the parking brake mechanism for the working vehicle are simplified and compacted, thereby improving freedom in design of piping or of working machines such as the mid-mount mower. Body frame 8 can be positively used for supporting the brake operation mechanism, so as to reduce the number of parts and manufacturing costs.

The invention claimed is:

1. A mower tractor, comprising:
   a mid-mount mower under a middle bottom portion thereof between front wheels and rear wheels;
   a body frame;
   a transmission casing having an input shaft disposed laterally eccentrically in the body frame;
   an engine having an output shaft;
   a propeller shaft interposed between the output shaft of the engine and the input shaft of the transmission casing;
   a height restricting device for restricting height of the mower disposed between the propeller shaft and the body frame and in front of said transmission casing;
   a lifting device disposed at a rear portion of the body frame behind the transmission casing; and
   a connection member disposed on one of left and right sides of the transmission casing so as to connect the lifting device to the height restricting device, wherein the height restricting device is disposed laterally opposite to the connection member with respect to the propeller shaft.

2. The mower tractor according to claim 1, further comprising:
   a reinforcing bracket spanned between left and right portions of the body frame at a position forwardly downward from the input shaft of the transmission casing, wherein the height restricting device for restricting height of the mower is disposed on the reinforcing bracket.

3. The mower tractor according to claim 1, wherein the height restricting device is disposed on a fore-and-aft extension line from the connection member, and the height restricting device is integrally formed with a connection portion connected to the connection member.

4. The mower tractor according to claim 1, wherein universal joints are interposed between the output shaft of the engine and the propeller shaft, and between the input shaft of the transmission casing and the propeller shaft, respectively.

5. A mower tractor comprising:
   a mid-mount mower under a middle bottom portion thereof between front wheels and rear wheels;
   a body frame;
   a transmission casing having an input shaft disposed laterally eccentrically in the body frame;
   an engine having an output shaft;
   a propeller shaft interposed between the output shaft of the engine and the input shaft of the transmission casing;
   a height restricting device for restricting height of the mower disposed between the propeller shaft and the body frame and in front of said transmission casing;
   a lifting device disposed at a rear portion of the body frame behind the transmission casing; and
   a connection member disposed on one of left and right sides of the transmission casing so as to connect the lifting device to the height restricting device, wherein a speed controlling link member connected to the transmission casing is disposed laterally opposite to the connection member with respect to the propeller shaft.

6. The mower tractor according to claim 5, wherein the speed controlling link member is disposed between the propeller shaft and the body frame above the height restricting device.

7. The mower tractor according to claim 5, wherein universal joints are interposed between the output shaft of the engine and the propeller shaft, and between the input shaft of the transmission casing and the propeller shaft, respectively.

8. The mower tractor according to claim 5, further comprising:
a reinforcing bracket spanned between left and right portions of the body frame at a position forwardly downward from the input shaft of the transmission casing, wherein the height restricting device for restricting height of the mower is disposed on the reinforcing bracket.

9. The mower tractor according to claim 5, wherein the height restricting device is disposed on a fore-and-aft extension line from the connection member, and the height restricting device is integrally formed with a connection portion connected to the connection member.

10. The mower tractor according to claim 5, wherein the height restricting device is disposed laterally opposite to the connection member with respect to the propeller shaft.

11. A mower tractor, comprising:
a mid-mount mower under a middle bottom portion thereof between front wheels and rear wheels;
a body frame;
a transmission casing having an input shaft disposed laterally eccentrically in the body frame;
an engine having an output shaft;
a propeller shaft interposed between the output shaft of the engine and the input shaft of the transmission casing;
a height restricting device for restricting height of the mower disposed between the engine and the transmission casing and in front of said transmission casing;
a lifting device disposed at a rear portion of the body frame behind the transmission casing; and
a connection member disposed on one of left and right sides of the transmission casing so as to connect the lifting device to the height restricting device, wherein the height restricting device is disposed laterally opposite to the connection member with respect to the propeller shaft.

12. The mower tractor according to claim 11, further comprising:
a reinforcing bracket spanned between left and right portions of the body frame at a position forwardly downward from the input shaft of the transmission casing, wherein the height restricting device for restricting height of the mower is disposed on the reinforcing bracket.

13. The mower tractor according to claim 11, wherein the height restricting device is disposed on a fore-and-aft extension line from the connection member, and the height restricting device is integrally formed with a connection portion connected to the connection member.

14. The mower tractor according to claim 11, wherein universal joints are interposed between the output shaft of the engine and the propeller shaft, and between the input shaft of the transmission casing and the propeller shaft, respectively.

15. A mower tractor comprising:
a mid-mount mower under a middle bottom portion thereof between front wheels and rear wheels;
a body frame;
a transmission casing having an input shaft disposed laterally eccentrically in the body frame;
an engine having an output shaft;
a propeller shaft interposed between the output shaft of the engine and the input shaft of the transmission casing;
a height restricting device for restricting height of the mower disposed between the engine and the transmission casing and in front of said transmission casing;
a lifting device disposed at a rear portion of the body frame behind the transmission casing; and
a connection member disposed on one of left and right sides of the transmission casing so as to connect the lifting device to the height restricting device wherein a speed controlling link member connected to the transmission casing is disposed laterally opposite to the connection member with respect to the propeller shaft.

16. The mower tractor according to claim 15, wherein the speed controlling link member is disposed between the propeller shaft and the body frame above the height restricting device.

17. The mower tractor according to claim 15, wherein universal joints are interposed between the output shaft of the engine and the propeller shaft, and between the input shaft of the transmission casing and the propeller shaft, respectively.

18. The mower tractor according to claim 15, farther comprising:
a reinforcing bracket spanned between left and right portions of the body frame at a position forwardly downward from the input shaft of the transmission casing, wherein the height restricting device for restricting height of the mower is disposed on the reinforcing bracket.

19. The mower tractor according to claim 15, wherein the height restricting device is disposed on a fore-and-aft extension line from the connection member, and the height restricting device is integrally formed with a connection portion connected to the connection member.

* * * * *